| (12) | United States Patent | (10) Patent No.: | US 11,489,998 B2 |
|---|---|---|---|
| | Mori | (45) Date of Patent: | Nov. 1, 2022 |

(54) IMAGE CAPTURING APPARATUS AND METHOD OF CONTROLLING IMAGE CAPTURING APPARATUS

(71) Applicant: CANON KABUSHIKI KAISHA, Tokyo (JP)

(72) Inventor: Shigeki Mori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/224,737

(22) Filed: Apr. 7, 2021

(65) Prior Publication Data

US 2021/0321033 A1 Oct. 14, 2021

(30) Foreign Application Priority Data

Apr. 9, 2020 (JP) .............................. JP2020-070563

(51) Int. Cl.
*H04N 5/232* (2006.01)
*B64C 39/02* (2006.01)

(52) U.S. Cl.
CPC ....... *H04N 5/23212* (2013.01); *B64C 39/024* (2013.01); *H04N 5/23216* (2013.01); *H04N 5/232933* (2018.08); *B64C 2201/123* (2013.01); *B64C 2201/127* (2013.01)

(58) Field of Classification Search
CPC .......... H04N 5/23212; H04N 5/23216; H04N 5/232933; H04N 5/232122; H04N 5/232939; H04N 5/23299; B64C 39/024; B64C 2201/123; B64C 2201/127
See application file for complete search history.

(56) References Cited

U.S. PATENT DOCUMENTS

| 2012/0219278 A1* | 8/2012 | Suzuki | ..................... G02B 7/28 396/95 |
|---|---|---|---|
| 2021/0185230 A1* | 6/2021 | Kuo | ................... H04N 5/23299 |

FOREIGN PATENT DOCUMENTS

JP 2003-185902 A 7/2003

\* cited by examiner

*Primary Examiner* — Lin Ye
*Assistant Examiner* — John H Morehead, III
(74) *Attorney, Agent, or Firm* — Canon U.S.A., Inc. IP Division

(57) ABSTRACT

An image capturing apparatus comprises an obtainment unit configured to obtain defocus amounts at a plurality of positions within an image capturing range of the image capturing apparatus, and an output unit configured to obtain information instructing a rotation of the image capturing apparatus based on a difference between defocus amounts that the obtainment unit obtained, and output the obtained information.

13 Claims, 24 Drawing Sheets

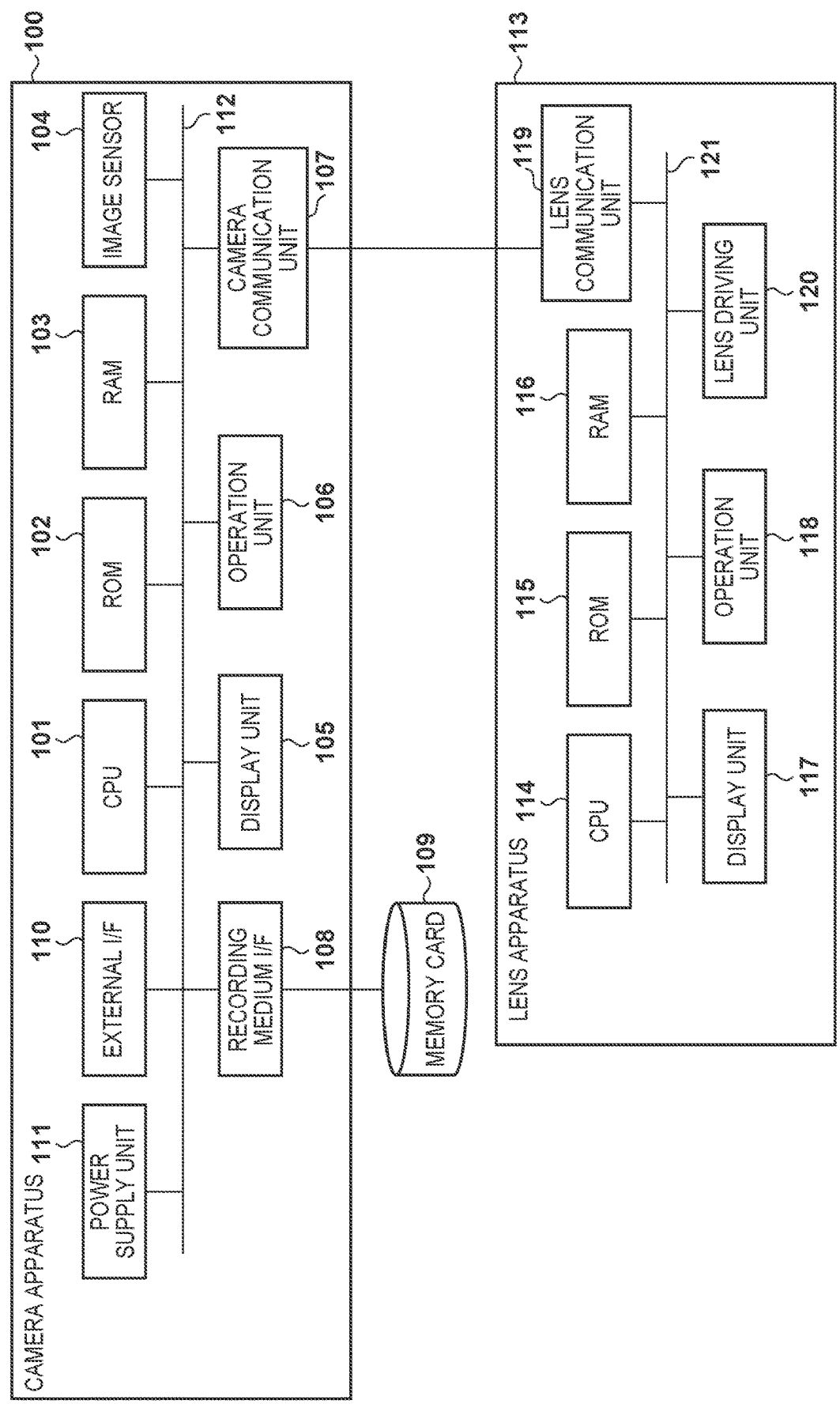

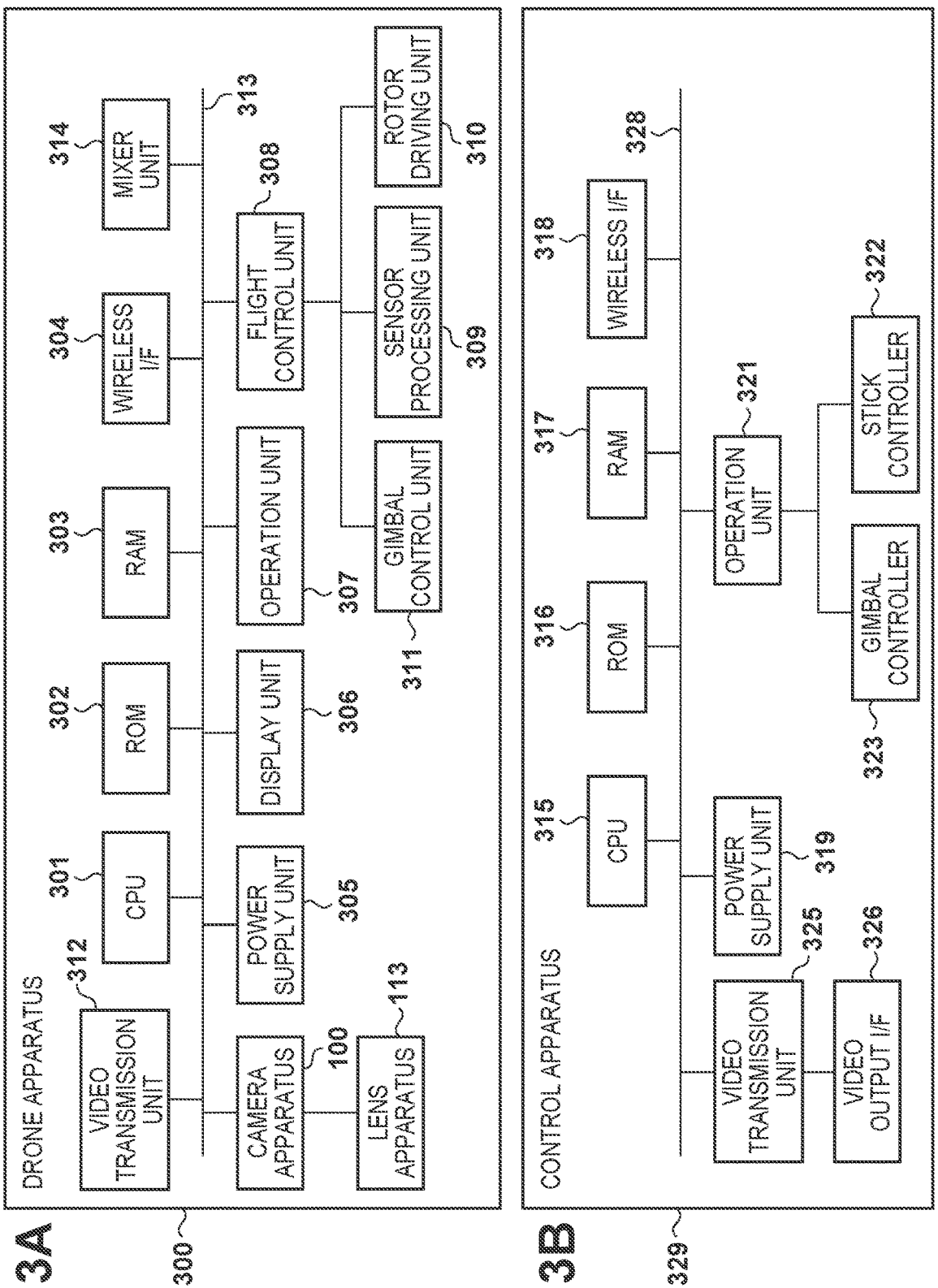

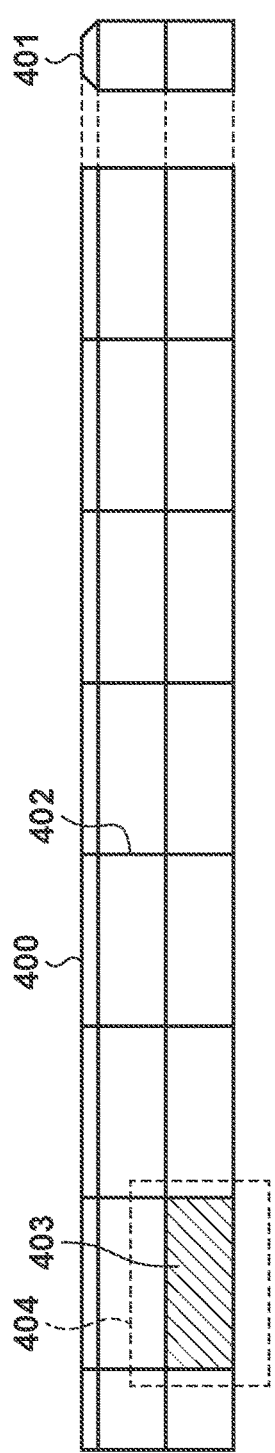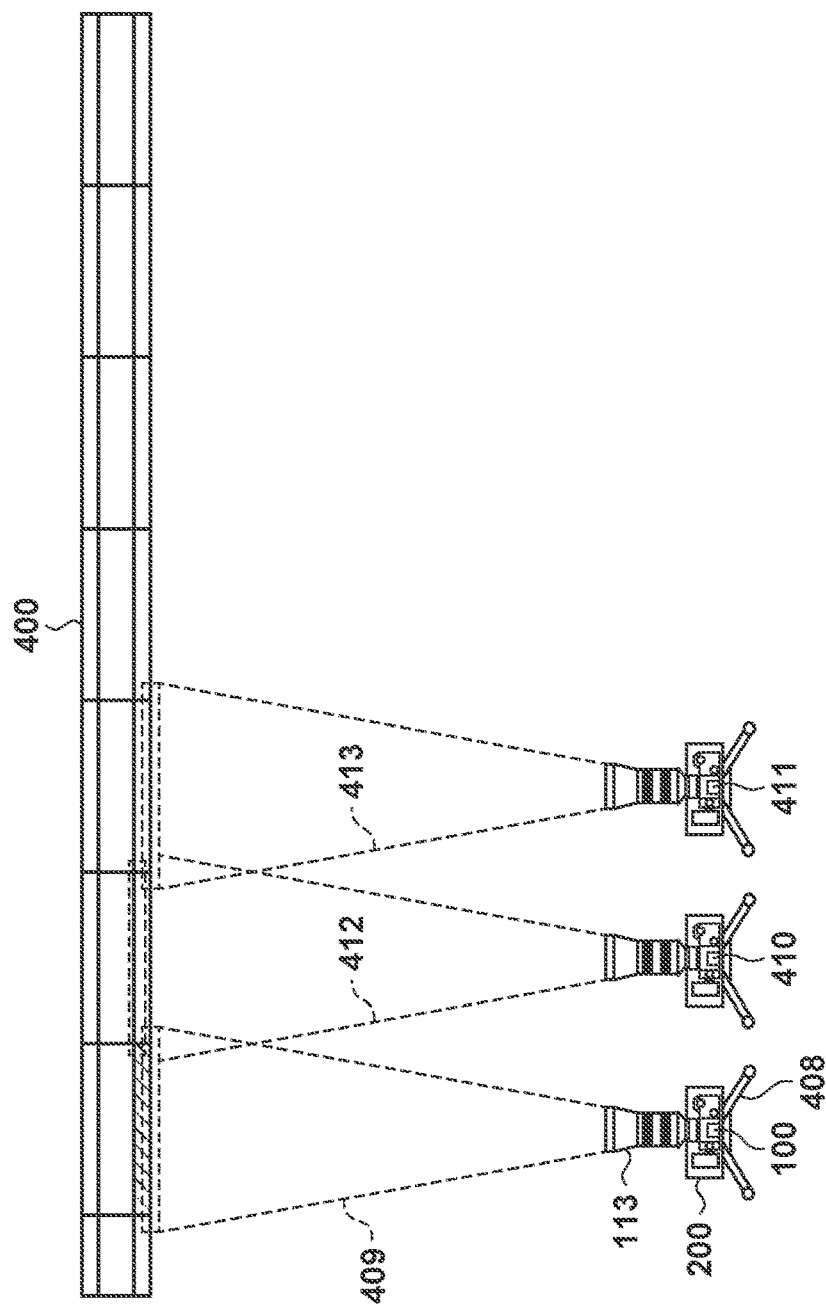

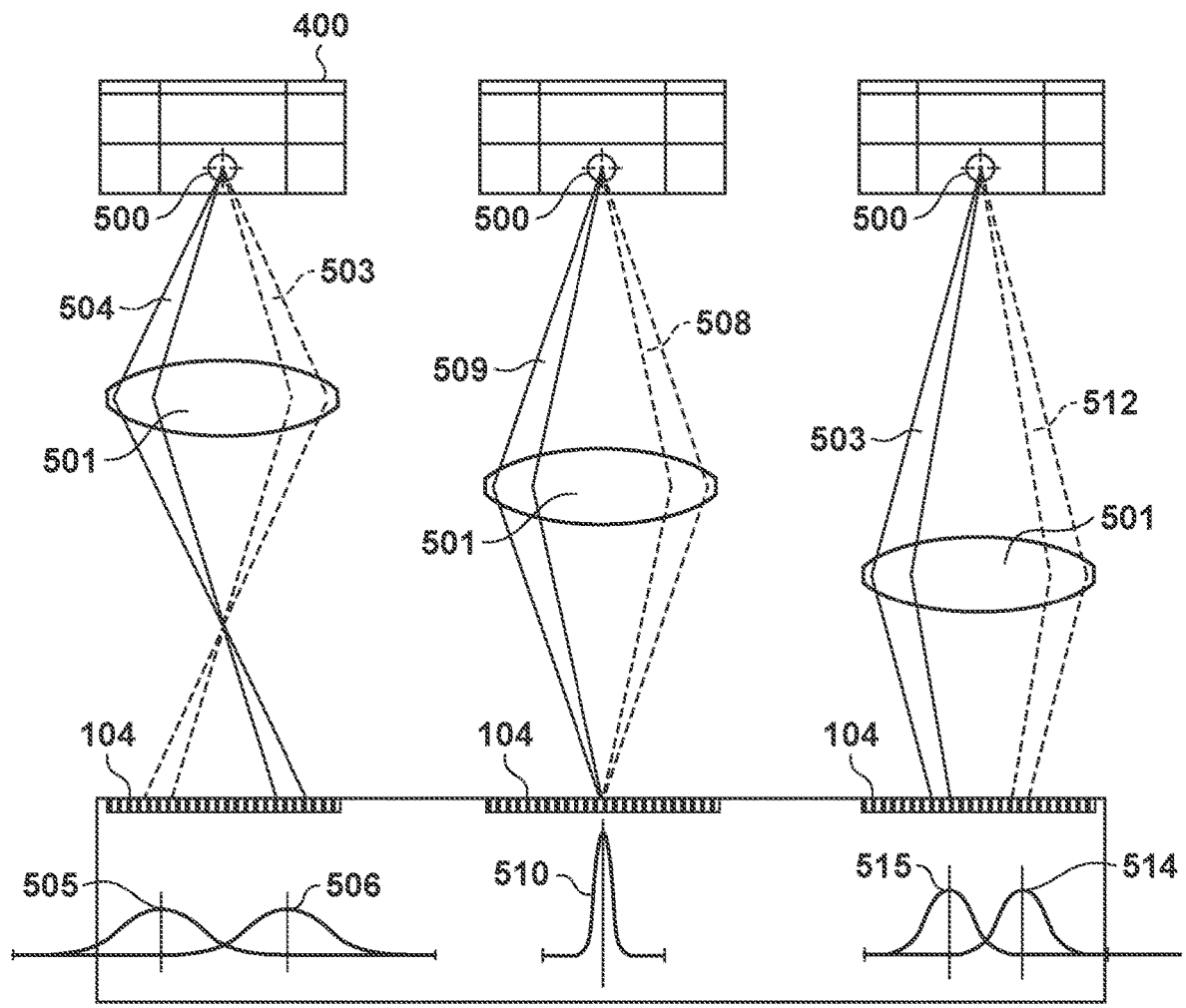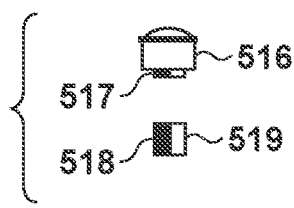

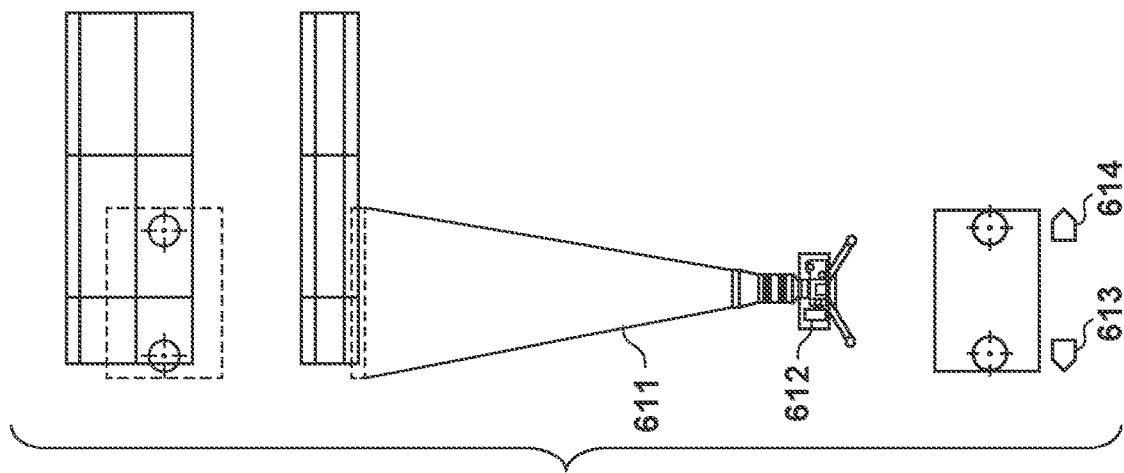
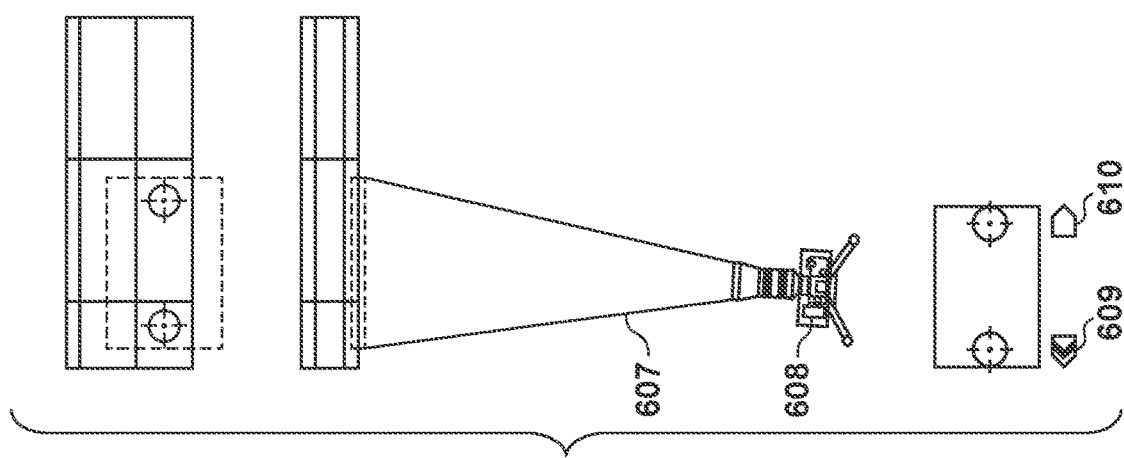
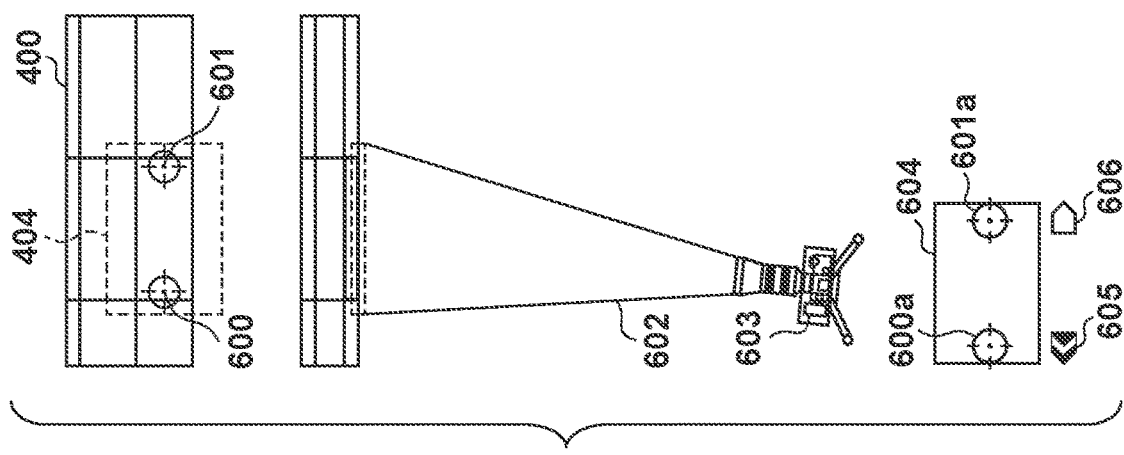

FIG. 6B

| Difference of defocus amounts (left edge value − right edge value) | Counterclockwise instruction information | Clockwise instruction information |
|---|---|---|
| +11 or more | ▼▼▼ (filled) | ▷▷▷ |
| +10 to +5 | ▼▼▼ | ▷▷▷ |
| +4 to +1 | ▽▽▽ | ▷▷▷ |
| 0 | ▽▽▽ | ▷▷▷ |
| −1 to −4 | ▽▽▽ | ▲▷▷ |
| −5 to −10 | ▽▽▽ | ▲▲▷ |
| −11 or less | ▽▽▽ | ▲▲▲ |

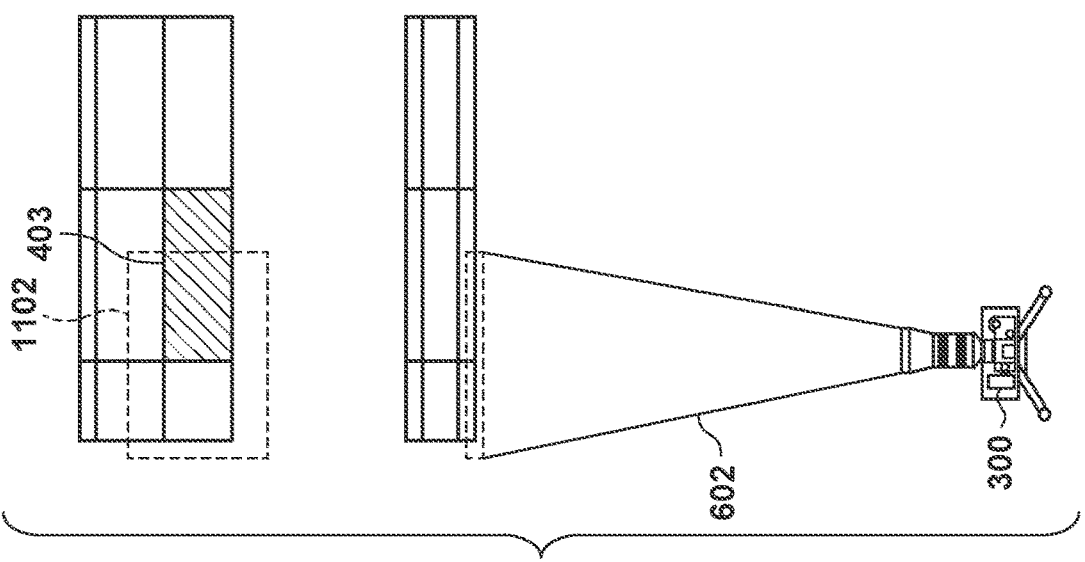
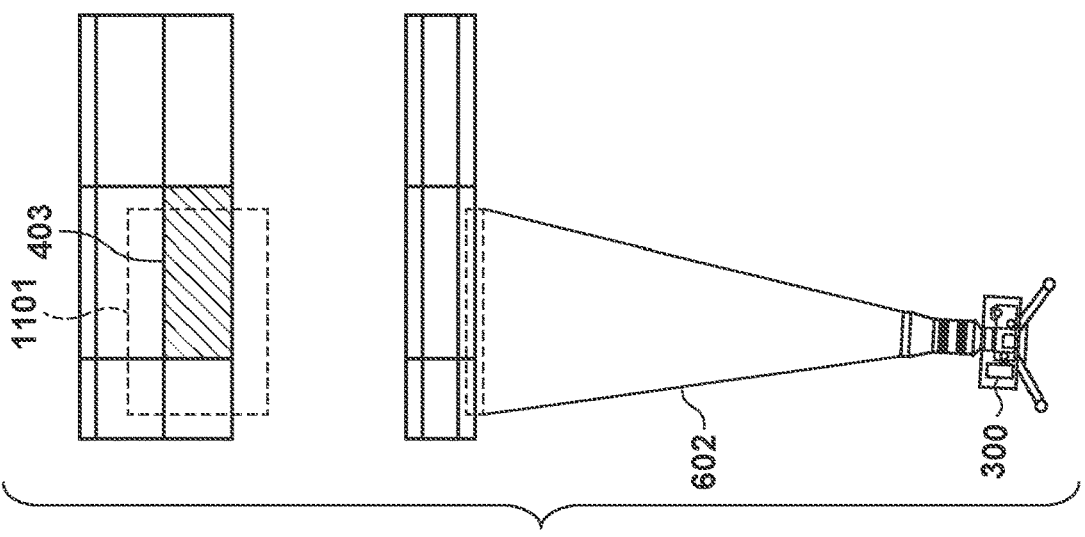
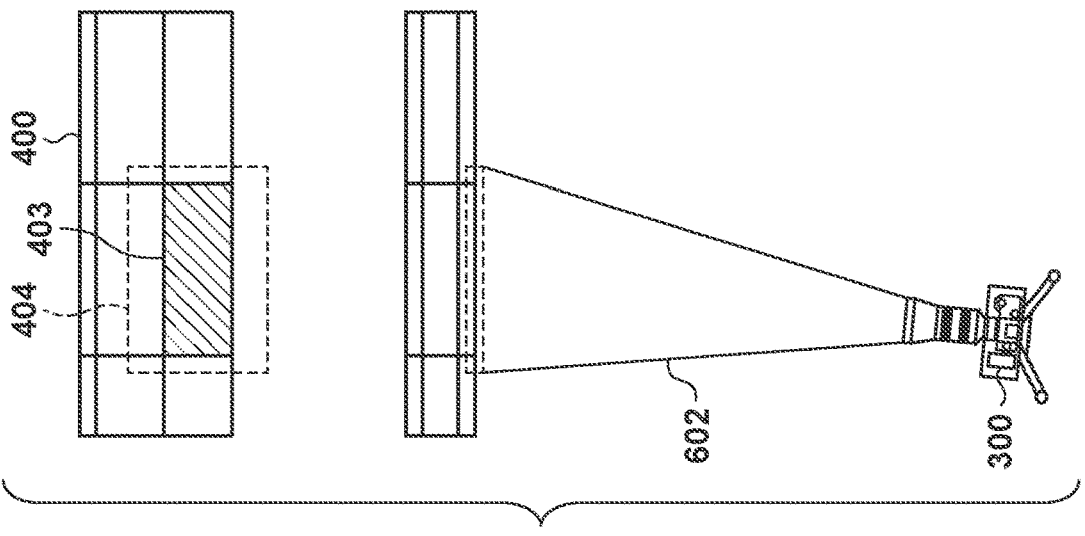

IMAGE CAPTURING APPARATUS AND METHOD OF CONTROLLING IMAGE CAPTURING APPARATUS

BACKGROUND

Field of the Disclosure

The present disclosure relates to an image capturing technique, in particular, relates to a technique for capturing an image used for inspection of a social infrastructure construction.

Description of the Related Art

In image capturing for social infrastructure inspection where a wide range inspection target surface is made to be the target of inspection, it is desirable to perform the image capturing such that the resolution or the like of the image is uniform in order to perform an inspection for a defect of the inspection target surface or the like under uniform conditions. To do so, either image capturing in which the image is obtained in a state in which "straightening for direct-facing" has been performed in relation to the inspection target surface, or image processing so as to achieve an image in a state in which "straightening for direct-facing" has been performed after image capturing is performed. Also, to capture an inspection target surface in a wide range, the image capturing apparatus is caused to move, and capturing of an adjacent inspection target surface is performed. In Japanese Patent Laid-Open No. 2003-185902, to measure a slope of a subject surface, based on contrast data of areas positioned in the top, bottom, left, and right of the image sensor and AF drive amounts corresponding to the lens, a distance measurement for the respective areas is performed. Then, by the results of the distance measurements for the respective areas, a degree to which the image capturing apparatus is directly facing a subject surface is detected, and thereby swing and tilt photography is performed by shifting the image capture plane of the image capturing apparatus. By this, even in a case where the image capturing apparatus itself is not installed so as to be straightened to directly face the subject surface, it is possible to achieve an image that looks as though it were captured in a state in which "straightening for direct-facing" had been performed.

However, in the case where the angle of the image capturing apparatus in relation to the inspection target surface is large, a defect, such as a crack or the like, in the inspection target surface will be observed from a diagonal direction. For this reason, even in the case where swing and tilt photography and "straightening for direct-facing" image processing is performed, if there is an angle in the direction in which a defect occurs or in the depth direction, it will not be possible to correctly inspect the width of a crack or the like. Also, when causing the image capturing apparatus to move in a horizontal direction in order to capture a wide range inspection target surface, if the image capturing apparatus is not straightened to directly face the inspection target surface, the distance to the inspection target surface gradually changes. As a result of this, it was not possible to capture images under uniform conditions for a wide range inspection target surface.

SUMMARY

Some embodiments of the present disclosure provide a technique for performing image capturing directly facing in relation to an image capturing target.

According to the first aspect of some embodiments, there is provided an image capturing apparatus, comprising: an obtainment unit configured to obtain defocus amounts at a plurality of positions within an image capturing range of the image capturing apparatus; and an output unit configured to obtain information instructing a rotation of the image capturing apparatus based on a difference between defocus amounts that the obtainment unit obtained, and output the obtained information.

According to the second aspect of some embodiments, there is provided a method of controlling an image capturing apparatus, the method comprising: obtaining defocus amounts at a plurality of positions within an image capturing range of the image capturing apparatus; and obtaining information instructing a rotation of the image capturing apparatus based on difference between the obtained defocus amounts, and outputting the obtained information.

Further features of various embodiments will become apparent from the following description of exemplary embodiments with reference to the attached drawings.

BRIEF DESCRIPTION OF THE DRAWINGS

FIG. 1A is a block diagram illustrating an example of a hardware configuration of a camera apparatus 100 and a lens apparatus 113.

FIGS. 3A and 3B are block diagrams illustrating example of a hardware configuration of a drone apparatus 300 and a hardware configuration of a control apparatus 329.

FIGS. 4A and 4B are views for explaining an image capturing method for capturing a social infrastructure construction.

FIGS. 5A to 5D are views illustrating a configuration for obtaining a defocus amount.

FIGS. 6AA, 6AB, and 6AC are views according to rotation control of the camera apparatus 100.

FIG. 6B is a view illustrating an example of a configuration of a table 615.

FIGS. 11A to 11C are views for describing a fourth embodiment.

DESCRIPTION OF THE EMBODIMENTS

Figure 1B:
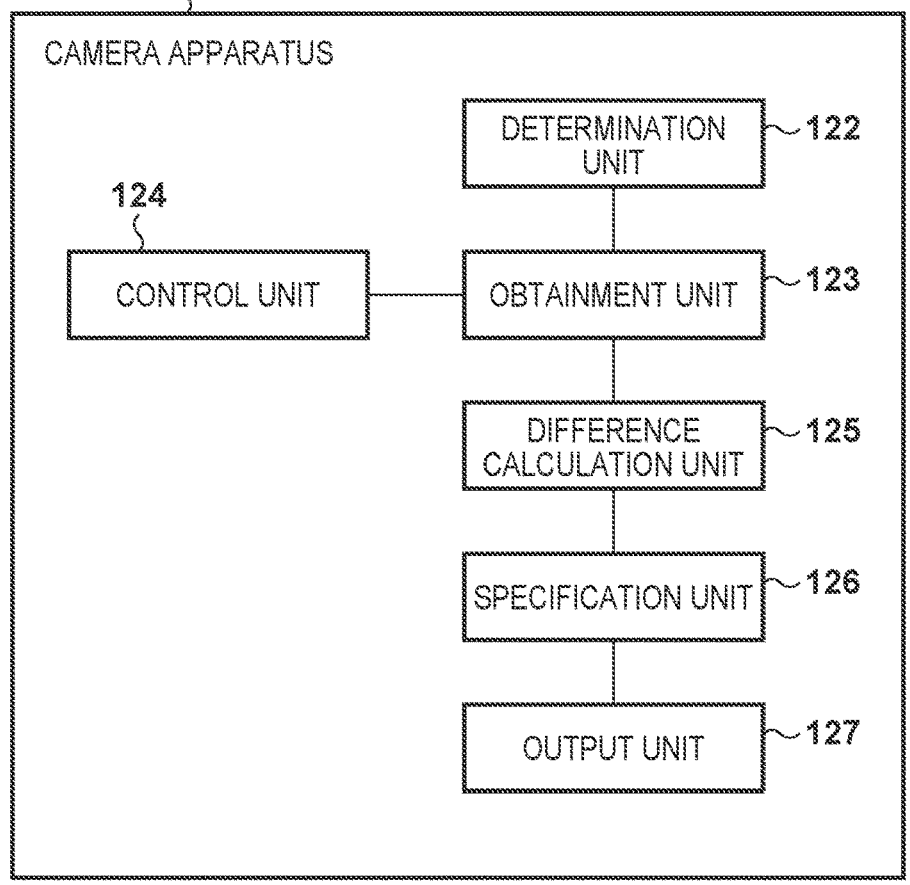
FIG. 1B is a block diagram illustrating an example of a functional configuration of the camera apparatus 100.

Example embodiments will be described hereinafter in detail, with reference to the accompanying drawings. Note, the following embodiments are not intended to limit all embodiments or the scope of the claims. Although a plurality of features are described in the embodiments, not all the features are essential to every embodiment, and the plurality of features may be combined as appropriate. Furthermore, in the accompanying drawings, the same reference numerals are assigned to the same or similar components, and repetitive description is omitted.

First Embodiment

First, an image capturing system according to the present embodiment will be described. The image capturing system according to the present embodiment is something for capturing an image of an inspection target surface of a structure that is the target of social infrastructure inspection, and in particular, is for easily realizing image capturing directly-facing the inspection target surface. An image capturing system according to the present embodiment has a camera apparatus, as an image capturing apparatus for capturing a moving image or capturing a still image regularly/irregularly, a lens apparatus that is attached to the camera apparatus, and a panhead for causing the camera apparatus to rotate.

First, explanation will be given using a block diagram of FIG. 1A for an example of a hardware configuration of the camera apparatus 100 and the lens apparatus 113 according to the present embodiment. FIG. 1A illustrates a state in which the lens apparatus 113 is attached onto the camera apparatus 100.

First, an example of a hardware configuration of the camera apparatus 100 will be explained. The camera apparatus 100 according to the present embodiment obtains a defocus amount at a plurality of positions in an image capturing range of the camera apparatus 100 and information instructing rotation of the camera apparatus 100 based on a difference between obtained defocus amounts, and outputs the obtained information.

The CPU (Central Processing Unit) 101 executes each type of processing using a computer program and data stored in the ROM (Read-Only Memory) 102 and the RAM (Random Access Memory) 103. By this, the CPU 101 performs control of operation of the camera apparatus 100 overall and executes or controls each process that is described later as something that the camera apparatus 100 performs.

The setting data of the camera apparatus 100, a computer program and data for activating the camera apparatus 100, a computer program and data for basic operation of the camera apparatus 100, and the like are stored in a ROM 102.

A RAM 103 has an area for storing computer programs and data read out from the ROM 102 and computer programs and data read out from a memory card 109 via a recording medium I/F 108. Furthermore, the RAM 103 has an area for storing captured images outputted from an image sensor 104, computer programs and data received from an external apparatus via an external I/F 110, and data received from the lens apparatus 113 by a camera communication unit 107. Furthermore, the RAM 103 has a work area that is used when the CPU 101 executes various processes. Accordingly, the RAM 103 can provide various areas as necessary.

The image sensor 104 is a two-dimensional arrangement of light-sensitive elements, and the image sensor 104 generates and outputs captured images in accordance with light that enters via the lens apparatus 113. A display unit 105 is a liquid crystal display (LCD), an organic electroluminescence display (OLED), or the like and is a device for displaying images and text on a display screen or a viewfinder screen. Note it is also possible that the display unit 105 is not provided in the camera apparatus 100 and, for example, is an external device that can communicate with the camera apparatus 100 wirelessly and/or by wire.

An operation unit 106 is a user interface, such as buttons, dials, a touch panel, a joystick, or the like, and a user can input various instructions to the CPU 101 by operating the operation unit 106.

The camera communication unit 107 performs data communication between the camera apparatus 100 and the lens apparatus 113. The recording medium I/F 108 is an interface for attaching the memory card 109 to the camera apparatus 100, and the CPU 101 performs reading/writing of data in relation to the memory card 109 via the recording medium I/F 108.

The memory card 109 may be, for example, a known card-type recording medium, such as an SD, CF, CFexpress, XQD, or CFast card. Also, the memory card 109 may be something that records data in an external apparatus via a wireless network.

The external I/F 110 is a communication interface for performing data communication with an external apparatus, and the CPU 101, via the external I/F 110, performs data communication with the external apparatus. A power supply unit 111 performs power supply and power management in the camera apparatus 100.

The CPU 101, the ROM 102, the RAM 103, the image sensor 104, the display unit 105, the operation unit 106, the camera communication unit 107, the recording medium I/F 108, the external I/F 110, and the power supply unit 111 are all connected to a system bus 112.

Next, an example of a hardware configuration of the lens apparatus 113 will be described. A CPU 114 executes various processes by using a computer program and data that is stored in a ROM 115 or a RAM 116. By this, the CPU 114 performs operation control of the lens apparatus 113 overall, and executes or controls various processes that are later-described as being performed by the lens apparatus 113.

The setting data of the lens apparatus 113, a computer program and data for activating the lens apparatus 113, a computer program and data for basic operation of the lens apparatus 113, and the like are stored in the ROM 115.

The RAM 116 has an area for storing computer programs and data that are read out from the ROM 115 and data that is received from the camera apparatus 100 by a lens communication unit 119. Furthermore, the RAM 116 has a work area that is used when the CPU 114 executes various processes. Accordingly, the RAM 116 can provide various areas as necessary.

The lens communication unit 119 performs data communication between the camera apparatus 100 and the lens apparatus 113. For example, the lens communication unit 119 receives control information from the camera apparatus 100 to the lens apparatus 113, communicates an operation state of the lens apparatus 113 and the like to the camera apparatus 100, and receives a supply of power from the camera apparatus 100.

A display unit 117 is a liquid crystal display (LCD), an organic electroluminescence display (OLED) or the like, and is a device that displays an operation state of the lens apparatus 113. Note it is also possible that the display unit 117 is not provided in the lens apparatus 113 and, for example, is an external device that can communicate with the lens apparatus 113 wirelessly and/or by wire.

An operation unit 118 is a user interface, such as buttons, dials, a touch panel, a joystick, or the like, and a user can input various instructions to the CPU 114 by operating the operation unit 118. Also, an instruction that a user inputs by operating the operation unit 118 can be transmitted to the camera apparatus 100 by the lens communication unit 119.

A lens driving unit 120 is something that controls an optical lens that the lens apparatus 113 has based on an instruction from the CPU 101 or the CPU 114, and thereby performs control of an aperture, focus, a zoom focal point, a camera shake correction, or the like. Light that enters via the optical lens after the aperture, focus, zoom focal point, camera shake correction or the like is controlled by the lens driving unit 120 is received by the above-described image sensor 104, and the image sensor 104 generates and outputs a captured image in accordance with the received light.

The CPU 114, the ROM 115, the RAM 116, the lens communication unit 119, the display unit 117, the operation unit 118, and the lens driving unit 120 are all connected to a system bus 121.

Figure 2:
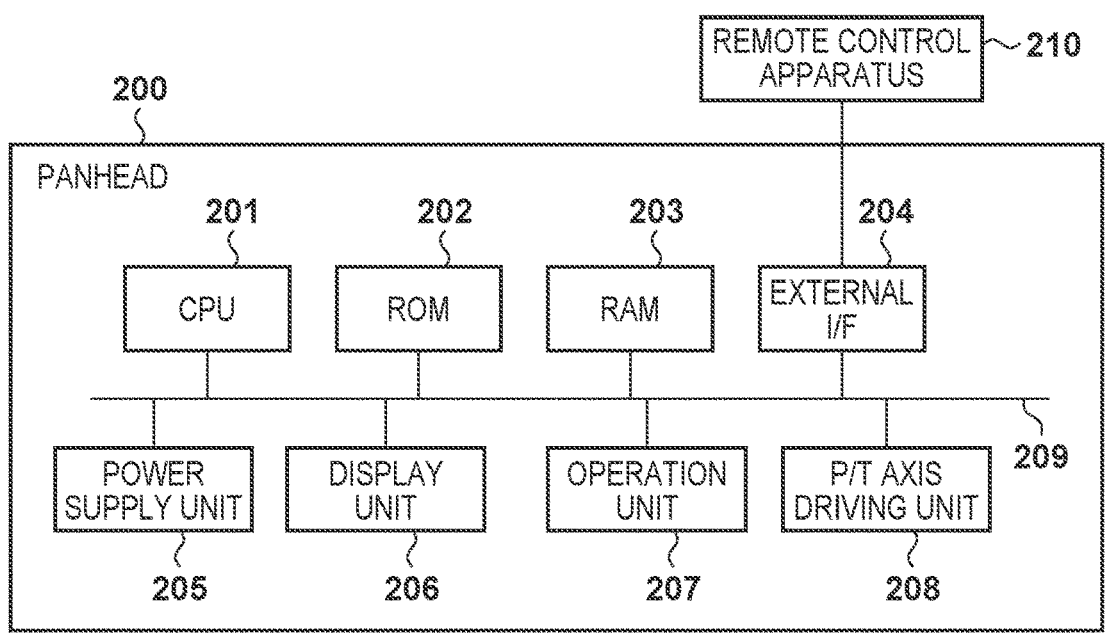
FIG. 2 is a block diagram illustrating an example of a hardware configuration of a panhead 200.

Next, explanation will be given using a block diagram of FIG. 2 for an example of a hardware configuration of the panhead 200 according to the present embodiment.

A CPU 201 executes various processes by using a computer program and data that is stored in a ROM 202 or a RAM 203. By this, the CPU 201 performs control of operation of the panhead 200 overall and executes or controls each process that is described later as something that the panhead 200 performs.

The setting data of the panhead 200, a computer program and data for activating the panhead 200, a computer program and data for basic operation of the panhead 200, and the like are stored in the ROM 202.

The RAM 203 has an area for storing computer programs and data that are read out from the ROM 202. Furthermore, the RAM 203 has a work area that is used when the CPU 201 executes various processes. Accordingly, the RAM 203 can provide various areas as necessary.

An external I/F 204 is a communication interface for obtaining various instructions from a remote control apparatus 210 by wireless or wired communications. The remote control apparatus 210 is an apparatus for inputting various instructions to the panhead 200, and the remote control apparatus 210 can input a change instruction for changing the pan angle or the tilt angle of the camera apparatus 100 which is mounted on the panhead 200, for example. Also, the external I/F 204 can perform communication with the camera apparatus 100 which is mounted on the panhead 200.

A power supply unit 205 performs power supply and power management in the panhead 200. A display unit 206 is a liquid crystal display (LCD), an organic electroluminescence display (OLED) or the like, and is a device that displays an operation state of the panhead 200. Note it is also possible that the display unit 206 is not provided in the panhead 200 and, for example, is an external device that can communicate with the panhead 200 wirelessly and/or by wire.

An operation unit 207 is a user interface, such as buttons, dials, a touch panel, a joystick, or the like, and a user can input various instructions to the CPU 201 by operating the operation unit 207.

A P/T axis driving unit 208 changes the pan angle and the tilt angle of the camera apparatus 100 mounted on the panhead 200 based on an instruction received from the remote control apparatus 210 via the external I/F 204 or the like.

The CPU 201, the ROM 202, the RAM 203, the external I/F 204, the power supply unit 205, the display unit 206, the operation unit 207, the P/T axis driving unit 208 are all connected to a system bus 209.

Next, an example of a functional configuration of the camera apparatus 100 will be described using a block diagram of FIG. 1B. Hereinafter, functional units illustrated in FIG. 1B are described as the performer of processing, but actually, the operations of these functional units are realized by the CPU 101 executing a computer program corresponding to the functional units. Also, the functional units illustrated in FIG. 1B may be implemented by hardware.

A determination unit 122 obtains setting information indicating "whether a rotation direction in which the camera apparatus 100 is caused to rotate in order that the camera apparatus 100 will directly face the inspection target surface of a structure that is the target of social infrastructure inspection is a vertical direction or a horizontal direction". The setting information is decided by, for example, a user operating the operation unit 106. The determination unit 122, if the rotation direction that the setting information indicates is the horizontal direction, sets two positions that are left/right aligned within an image capturing range of the camera apparatus 100 (for example, a position in a vicinity of a left edge and a position in a vicinity of a right edge within the image capturing range) as "positions for obtaining a defocus amount". Meanwhile, the determination unit 122, if the rotation direction that the setting information indicates is the vertical direction, sets two positions that are top/bottom aligned within an image capturing range of the camera apparatus 100 (for example, a position in a vicinity of a top edge and a position in a vicinity of a bottom edge within the image capturing range) as "positions for obtaining a defocus amount".

A control unit 124 obtains a defocus amount from the "positions for obtaining the defocus amount" that the determination unit 122 decided within the image capturing range of the camera apparatus 100. An obtainment unit 123 obtains the defocus amount obtained by the control unit 124. A difference calculation unit 125 calculates a difference between one defocus amount that the obtainment unit 123 obtained and another defocus amount that the obtainment unit 123 obtained.

A specification unit 126, based on a difference that the difference calculation unit 125 calculated, identifies notification information for notifying "a rotation direction and a degree of rotation for causing the camera apparatus 100 to rotate". An output unit 127 outputs notification information that the specification unit 126 specified.

In the present embodiment, by using such an image capturing system, image capturing of an inspection target social infrastructure construction is performed, and the inspection of the social infrastructure construction is performed based on the captured image obtained by this image capturing. The image capturing method by which the social infrastructure construction is captured using the image capturing system according to the present embodiment will be described using FIGS. 4A and 4B.

An example of an inspection target surface in a social infrastructure construction that is an inspection target is illustrated in FIG. 4A. The social infrastructure construction 400 illustrated in FIG. 4A is a wall-shaped structure that has a side surface 401 and is horizontally long. A reference numeral 402 indicates a joint portion that occurs when dividing the social infrastructure construction 400 based on a drawing and making a joint to build it. The 402 portion is referred to as a seam, but here it is referred to as a joint for simplicity. The joint portion 402 can be seen visually and is therefore used as a unit for performing inspection work. The reference numeral 403 denotes a region (inspection target region) that is the target of a single inspection, and the image capturing system captures an image capturing region 404 including an inspection target region 403. In a captured image that captured the image capturing region 404, a "partial image corresponding to a peripheral portion of the inspection target region 403 within the image capturing region 404" is information for ascertaining a positional relationship with respect to an adjacent inspection target region. Accordingly, this partial image is used as a positional alignment for when compositing into one image that includes the entire social infrastructure construction 400. Also, a partial image corresponding to this peripheral portion is used for inspection of a wide range defect that is not limited to a single inspection target region.

A situation in which the image capturing region 404 is captured using an image capturing system according to the present embodiment is illustrated in FIG. 4B. In FIG. 4B, the camera apparatus 100 is attached to the panhead 200 which has a tripod 408, and the lens apparatus 113 is attached to the camera apparatus 100. A width (in the figure, the size in the horizontal direction) in the inspection target surface of an image capturing range 409 captured by combination of the camera apparatus 100 and the lens apparatus 113 corresponds to a width of the image capturing region 404 (size in the horizontal direction in the figure).

Then, when image capturing of the inspection target region 403 completes, in order to perform image capturing of a yet-to-be-captured inspection target region that is adjacent to the inspection target region 403, the image capturing system according to the present embodiment is caused to move to a position denoted by a reference numeral 410, and similarly, capturing of the inspection target region within an image capturing range 412 is performed. When image capturing completes for the position that the reference numeral 410 denotes, in order to perform image capturing of a yet-to-be-captured inspection target region that is adjacent to the inspection target region, the image capturing system according to the present embodiment is caused to move to a position denoted by a reference numeral 411, and similarly, capturing of the inspection target region within an image capturing range 413 is performed.

Here, it is necessary that the camera apparatus 100 be directly facing the inspection target region. In the present embodiment, it is determined whether or not the camera apparatus 100 is directly facing the inspection target region, and if it is not directly facing, a notification for causing the camera apparatus 100 to rotate so that it directly faces the inspection target region is made.

To make this notification, as described above, the control unit 124 obtains a defocus amount for positions that the determination unit 122 decides. Here, a configuration for obtaining a defocus amount is described using FIGS. 5A to 5D.

FIG. 5A is a view illustrating a configuration for, in the camera apparatus 100 in which an entire surface imaging plane phase difference sensor is mounted, obtaining a defocus amount which is a peak value difference of the phase that the imaging plane phase difference sensor detected when the focus position of the lens apparatus 113 is a position when front focused.

FIG. 5B is a view that illustrates a configuration for, in the camera apparatus 100 in which an entire surface imaging plane phase difference sensor is mounted, obtaining a defocus amount which is a peak value difference of the phase that the imaging plane phase difference sensor detected when the focus position of the lens apparatus 113 is a position when in-focus.

FIG. 5C is a view illustrating a configuration for, in the camera apparatus 100 in which an entire surface imaging plane phase difference sensor is mounted, obtaining a defocus amount which is a peak value difference of the phase that the imaging plane phase difference sensor detected when the focus position of the lens apparatus 113 is a position when rear-focused.

Note that it is possible to apply various sensors for the imaging plane phase difference sensor, but in the present embodiment, the image sensor 104 is used as the imaging plane phase difference sensor. FIG. 5D is a view illustrating an example of a configuration of a single light-sensitive element in the image sensor 104.

As illustrated in FIG. 5D, a light-sensitive element 517 is configured by a pair of a light-sensitive element 518 which receives a right image and a light-sensitive element 519 which receives a left image, and a microlens 516 collects light from the outside world in the light-sensitive element 517. At that time, by the positioning of the microlens 516 and the pair of the light-sensitive element 517, configuration is such that a luminous flux that passes through a right half of an optical lens 501 is guided to the light-sensitive element 518, and a luminous flux that passes through a left half of the optical lens 501 is guided to the light-sensitive element 519.

By such a configuration, as illustrated in FIG. 5A, in a case where the position of the optical lens 501 is in a front-focused state, among the luminous flux from a point of interest 500 of the social infrastructure construction 400, a luminous flux 503 passes through the right side of the optical lens 501 and is received by the light-sensitive element 518. Also, a luminous flux 504 which passes through the left side of the optical lens 501 is received by the light-sensitive element 519. As a result, as illustrated in FIG. 5A, the luminous flux received by the pair of light-sensitive elements is detected as the signals 505 and 506 having peak values with different phases respectively.

Also, as illustrated in FIG. 5B, in a case where the position of the optical lens 501 is in an in-focus state in relation to the point of interest 500, out of the luminous flux from the point of interest 500 of the social infrastructure construction 400, a luminous flux 508 that passes through the right side of the optical lens 501 and a luminous flux 509 that passes through the left side of the optical lens 501 is detected as a signal 510 which has peak values whose phases match in the pair of light-sensitive elements, as illustrated in FIG. 5B.

Also, as illustrated in FIG. 5C, in a case where the position of the optical lens 501 is in a rear-focused state in relation to the point of interest 500, out of the luminous flux from the point of interest 500 of the social infrastructure construction 400, a luminous flux 512 that passes through the right side of the optical lens 501 and a luminous flux 513 that passes through the left side of the optical lens 501 is detected as "the signals 515 and 514 which have different peak values with opposite phase differences to the case of FIG. 5A" in the pair of light-sensitive elements as illustrated in FIG. 5C.

In the present embodiment, a defocus amount value is defined based on a distance between the left and right positions of the peak values of the signals received by the two-dimensional arrangement of the light-sensitive element 517 configured by the pair of light-sensitive elements (the light-sensitive elements 518 and 519). For example, the defocus amounts corresponding to the respective in-focus conditions of FIG. 5A, FIG. 5B, and FIG. 5C can be defined as "−11", "0", and "+7".

Figure 7:
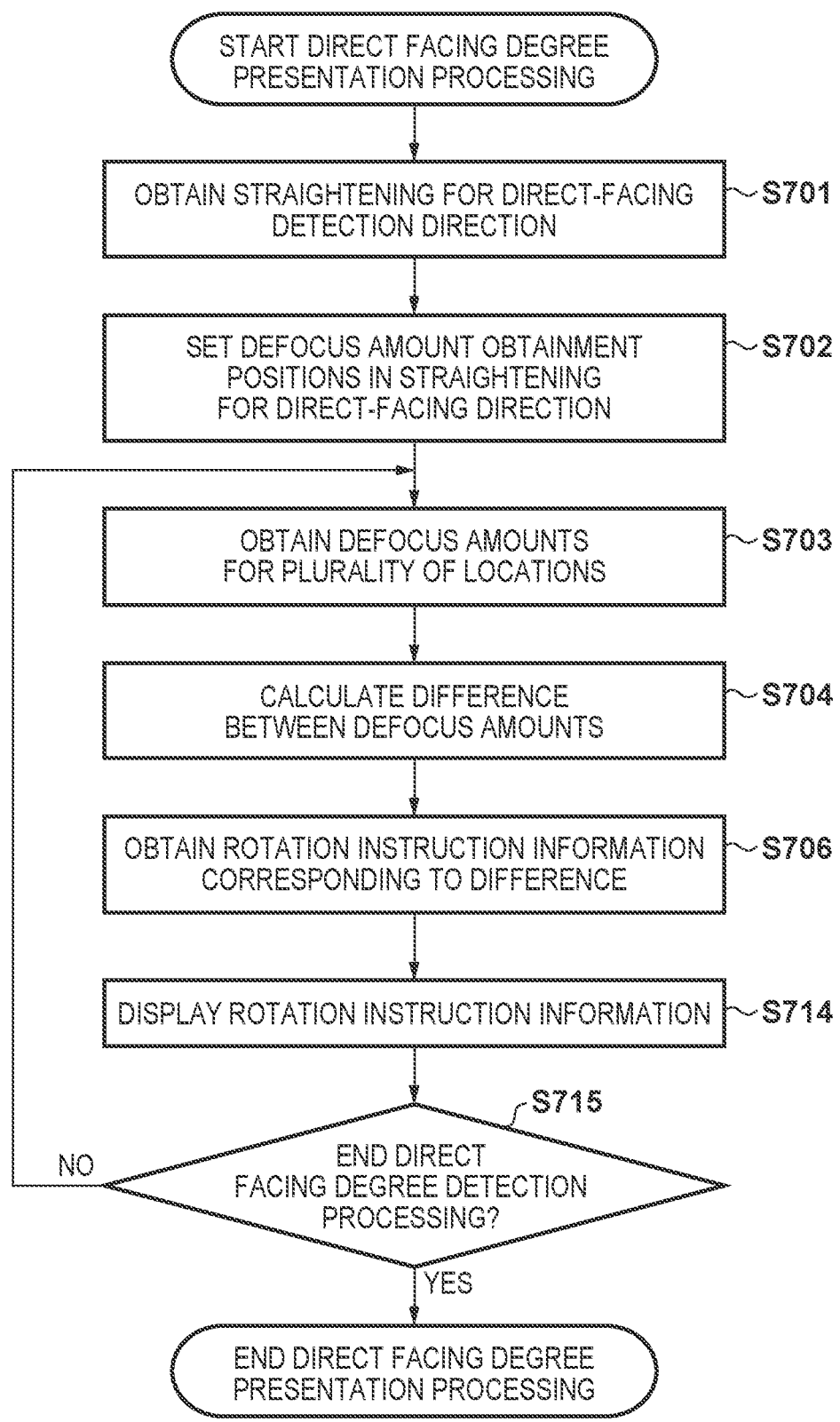
FIG. 7 is a flowchart of operations of an image capturing system.

Next, description will be given for operation of an image capturing system according to the present embodiment in accordance with a flowchart of FIG. 7. As described above, the user installs the image capturing system so as to face the inspection target surface in order to perform image capturing of the inspection target surface using the image capturing system according to the present embodiment. At that time, the user can install the camera apparatus 100 in an orientation thought to be approximately "straightened for direct-facing" in relation to the inspection target region. However, in a case where there is a lack of structure and installation location reference points and accurate measurement amount information for the periphery, the state is such that it is not possible to accurately install the camera apparatus 100 in an orientation in which it is "straightened for direct-facing". When the camera apparatus 100 is powered on after installation of the camera apparatus 100, a captured image which was captured by the image sensor 104, as a live view image, is displayed on a back display screen of the camera apparatus 100 by the display unit 105. Then, the process according to the flowchart of FIG. 7 is started.

In S701, the determination unit 122 obtains setting information indicating "whether a rotation direction in which the camera apparatus 100 is caused to rotate in order that the camera apparatus 100 directly faces the inspection target surface is a vertical direction or a horizontal direction".

Figure 8A:
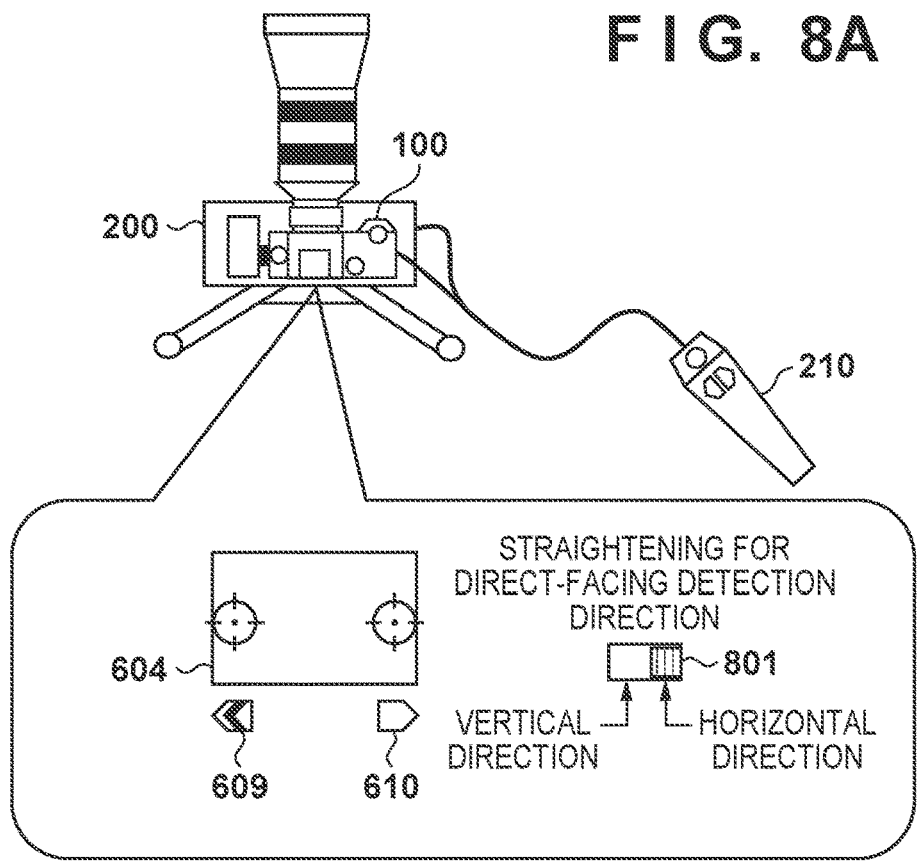
FIGS. 8A and 8B are views for describing a switch 801, the drone apparatus 300, and the control apparatus 329.

For example, as illustrated in FIG. 8A, the operation unit 106 has the switch 801 for setting so that the "rotation direction in which the camera apparatus 100 is caused to rotate in order that the camera apparatus 100 directly faces the inspection target surface is a vertical direction or a horizontal direction" (straightening for direct-facing detection direction). The user can, by operating the switch 801, set the straightening for direct-facing detection direction to either of the vertical direction (the axis of rotation=the tilt axis) and the horizontal direction (the axis of rotation=the pan axis). The determination unit 122 obtains, as setting information, the straightening for direct-facing detection direction set by the switch 801. As illustrated in FIG. 4A and FIG. 4B, in the case where a horizontally long structure is captured after a horizontal movement, straightening for direct-facing detection direction is selected to be in the horizontal (rotation) direction. Hereinafter, as an example, a case where the straightening for direct-facing detection direction is set to the horizontal direction will be described.

Next, in S702, the determination unit 122 sets two positions that are left/right lined up in the image capturing range of the camera apparatus 100 as the "positions for obtaining a defocus amount" since the straightening for direct-facing detection direction is the horizontal direction. For example, as illustrated in FIG. 6AA, the determination unit 122 sets, as the "positions for obtaining a defocus amount", a position 600 in the vicinity of the left edge of the image capturing region 404 and a position 601 in the vicinity of the right edge which fit into an image capturing range 602 of the camera apparatus 100 in the social infrastructure construction 400.

In S703, the control unit 124 obtains, as described above, the defocus amount for the positions set in S702 (in the case of FIG. 6AA, the position 600 and the position 601). At that time, there is no need for the camera apparatus 100 to perform a focusing operation in relation to the inspection target surface, and the defocus amount for the position set in S702 is obtained.

In S704, the obtainment unit 123 obtains the "defocus amount for the position on the left side" obtained in S703 and the "defocus amount for the position on the right side". Then, the difference calculation unit 125 calculates the difference when the "defocus amount for the position on the right side" is subtracted from the "defocus amount for the position on the left side".

In S706, the specification unit 126 obtains, as rotation instruction information (notification information), "information indicating a rotation direction and a rotation degree of the camera apparatus 100" corresponding to the difference between the defocus amounts calculated in S704.

Here, the table 615 in which rotation instruction information corresponding to difference between defocus amounts is registered as illustrated in FIG. 6B is registered in the ROM 102. In a column 616, sections for differences between defocus amounts are registered. For example, in the row 619 in the column 616, the section "+11 or more" for the difference between defocus amounts is registered, and in the row 624 in the column 616, the section "−5 to −10" for the difference between defocus amounts is registered.

In column 617, an icon corresponding to the amount of rotation in the case of a counterclockwise rotation of the camera apparatus 100 is registered. An icon registered in the row 619 in the column 617 indicates a larger amount of rotation than an amount of rotation that the icon registered in the row 620 in the column 617 indicates. An icon registered in the row 621 in the column 617 indicates a larger amount of rotation than an amount of rotation that the icon registered in the row 620 in the column 617 indicates. The icons registered in the rows 622 to 625 in the column 617 indicate that there is no need for counterclockwise rotation.

In column 618, icons corresponding to the amount of rotation in the case of a clockwise rotation of the camera apparatus 100 are registered. An icon registered in the row 625 in the column 618 indicates a larger amount of rotation than an amount of rotation that the icon registered in the row 624 in the column 618 indicates. An icon registered in the row 624 in the column 618 indicates a larger amount of rotation than an amount of rotation that the icon registered in the row 623 in the column 618 indicates. The icons registered in the rows 619 to 622 in the column 618 indicate that there is no need for clockwise rotation.

Accordingly, for example, the specification unit 126, in a case where the difference between the defocus amount calculated in S704 is "+7", obtains the two icons registered in the row 620 corresponding to the section "+10 to +5", which includes the difference "+7", as rotation instruction information.

Also, for example, the specification unit 126, in the case where the difference between the defocus amounts obtained in S704 is "−12", obtains, as rotation instruction information, the two icons registered in the row 625 corresponding to the section "−11 or less", which includes the difference "−12".

In other words, in the table of FIG. 6B, rotation instruction information for notifying a rotation direction corresponding to the sign of the difference between defocus amounts and the degree of rotation corresponding to the absolute value of the difference between defocus amounts is registered.

In S714, the output unit 127 outputs to the display unit 105 the rotation instruction information obtained in S706 as "notification information for notifying, to a user, a rotation direction of the camera apparatus 100 and a degree of rotation". The display unit 105 displays the notification information on a display screen on the back of the camera apparatus 100. For example, as illustrated in FIG. 6AA, an icon 605 obtained from the column 617 is displayed on the bottom left side of a live view image 604 displayed on the display screen on the back of the camera apparatus 100. Also, the icon 606 obtained from the column 618 on the bottom right side of the live view image 604 is displayed. Note that the display position of the icon 605 and the icon 606 are not limited to a specific display position, and for example the display may be overlapped on the live view image 604. Also, in FIG. 6AA, in the live view image 604, the icons 600a and 601a are displayed to be overlapped on positions respectively corresponding to the position 600 and the position 601.

A user, having visually observed the displayed icons 605 and 606, will recognize the notification to rotate the camera apparatus 100 counterclockwise and will rotate the camera apparatus 100 counterclockwise. A state after the camera apparatus 100 in the state of FIG. 6AA has been rotated counterclockwise is illustrated in FIG. 6AB.

In the state of FIG. 6AB as well, the icons 609 and 610 are still being displayed, and similarly, a user recognizes a notification to rotate the camera apparatus 100 counterclockwise and rotates the camera apparatus 100 counterclockwise. Here, the icon 606 and the icon 610 indicate that there is no need to rotate clockwise. Meanwhile, the icon 605 and the icon 609 both indicate that a counterclockwise rotation is necessary, but the icon 609 indicates an amount of rotation that is less than that of the icon 605. A state after the camera apparatus 100 in the state of FIG. 6AB is further rotated counterclockwise is illustrated in FIG. 6AC.

In the state of FIG. 6AC, an icon 613 which indicates that a counterclockwise rotation is not necessary and an icon 614 which indicates that a clockwise rotation is not necessary are displayed. A user, having visually observed the displayed icons 613 and 614, will recognize the notification that it is not necessary to rotate the camera apparatus 100 counterclockwise or clockwise, and will not rotate the camera apparatus 100.

FIG. 8A is a view illustrating a state in which the camera apparatus 100 is mounted on the panhead 200, and the remote control apparatus 210 by which to perform pan/tilt operations on the panhead 200 and image capturing operations on the camera apparatus 100 is connected thereto. Here, the remote control apparatus 210, by connecting with the camera apparatus 100 via the external I/F 110 of the camera apparatus 100, enables image capturing by the camera apparatus 100.

Returning to FIG. 7, in S715, the CPU 101 determines whether or not an end condition for processing according to the flowchart of FIG. 7 is satisfied. For example, the CPU 101, in a case where a user inputs an instruction to end the processing by operating the operation unit 106 or turns off the power supply of the camera apparatus 100, the CPU 101 determines whether an end condition for the processing according to the flowchart of FIG. 7 is satisfied.

If the result of such a determination is that the end condition for the processing according to the flowchart of FIG. 7 is satisfied, the processing according to the flowchart of FIG. 7 ends, and in a case where the end condition has not been satisfied, the processing advances to S703.

Accordingly, the panhead 200 on which the camera apparatus 100 is mounted is installed to face the inspection target surface as in FIG. 8A, and it becomes possible to notify the user of the rotation instruction information for straightening for direct-facing in relation to the inspection target surface. Also, the user, having received this notification, performs an operation of the panhead 200 or the like in accordance with the notification, and thereby can perform straightening for direct-facing accurately on the camera apparatus 100 in relation to the inspection target surface, and so an accurate defect inspection becomes possible. Also, simultaneously, by performing straightening for direct-facing accurately, the camera apparatus 100 is caused to make a parallel shift when capturing an image of the region adjacent to the inspection target surface, and thereby image capturing under uniform conditions in relation to the inspection target surface becomes possible.

Note that in the present embodiment, configuration is such that the rotation direction for straightening for direct-facing is made to be the horizontal (rotation) direction, and the pan axis of the panhead 200 is operated, but configuration may be taken to switch the straightening for direct-facing detection direction to make a rotation instruction for straightening for direct-facing in relation to the vertical (rotation) direction, and operate the tilt axis. Furthermore, configuration may be taken so that detection of the horizontal (rotation) direction and the vertical (rotation) direction is performed simultaneously, and respective rotation instruction information is presented.

Also, in the present embodiment, an example regarding the defocus amount is presented, and three types of rotation instruction information are defined, but since the value of the defocus amount differs depending on the type of imaging plane phase difference sensor that is used, configuration may be taken to use the defocus amount value after multiplying it by an appropriate coefficient or the like, and there is no limitation to the types either.

Also, in the present embodiment, an icon indicating both the rotation direction and the degree of rotation is displayed, but configuration may be taken to display both an icon indicating the rotation direction and an icon indicating the degree of rotation, and configuration may be taken to display only one of these. Also, information indicating the rotation direction and the degree of rotation is not limited to an icon, and, for example, character information is also possible. Also, the method of notifying the rotation direction and the degree of rotation is not limited to any particular notification method.

Also, in the present embodiment, an icon for a direction in which rotation is not necessary is displayed, but configuration may be such that no icon is displayed for a direction for which rotation is not necessary. Also, configuration may be taken so as to add an icon for a direction for which rotation is necessary, and further display other information, such as character information.

Second Embodiment

In each embodiment below including the present embodiment, description will be given of differences from the first embodiment, and to the extent that something is not particularly touched upon, assume that it is similar to in the first embodiment. In the image capturing system according to a first embodiment, a configuration is such that the camera apparatus 100 is mounted in the panhead 200, but configuration may be such that the camera apparatus 100 is mounted in a UAV (unmanned aerial vehicle), such as a drone apparatus or the like. In the present embodiment, as an example of such an image capturing system, an image capturing system having a drone apparatus on which the camera apparatus 100 is mounted and a control apparatus for controlling the drone apparatus is described.

First, explanation will be given using a block diagram of FIG. 3A for an example of a hardware configuration of the drone apparatus 300 according to the present embodiment. A CPU 301 executes various processes by using a computer program and data that is stored in a ROM 302 or a RAM 303. By this, the CPU 301 performs control of operation of the drone apparatus 300 overall and executes or controls each process that is described later as something that the drone apparatus 300 performs. Note that the CPU 301 may be configured to perform control of operation of the camera apparatus 100 and the lens apparatus 113.

The setting data of the drone apparatus 300, a computer program and data for activating the drone apparatus 300, a computer program and data for basic operation of the drone apparatus 300, and the like are stored in the ROM 302.

The RAM 303 has an area for storing computer programs and data loaded from the ROM 302, information such as an image outputted from the camera apparatus 100, and data received from an external unit via a wireless IF 304. Furthermore, the RAM 303 has a work area that is used when the CPU 301 executes various processes. Accordingly, the RAM 303 can provide various areas as necessary.

The wireless IF 304 functions as a communication interface for performing wireless communication with an external unit. A power supply unit 305 performs power supply and power management in the drone apparatus 300. A display unit 306 is a liquid crystal display (LCD) or an organic electroluminescence display (OLED) or the like, and is a device for displaying images or text on the screen.

An operation unit 307 is a user interface, such as a button, a dial, a touch panel, a joystick or the like, and by user operations, various instructions can be inputted to the CPU 301.

A flight control unit 308, by controlling a driving unit 310 based on a signal from a mixer unit 314, controls a position and orientation of the drone apparatus 300, and controls flying of the drone apparatus 300.

A sensor processing unit 309, by processing information measured by a sensor, obtains information (sensor information) necessary for performing flight control of the drone apparatus 300, such as the self position, orientation, or the like. A gyro sensor, an acceleration sensor, a GNSS (Global Navigation Satellite System), an atmospheric pressure sensor, an ultrasonic sensor (altitude sensor, distance sensor), a sensor for obtaining terrestrial video images, or the like, may be applied to this sensor.

The driving unit 310 performs control of driving of a rotor for causing the drone apparatus 300 to fly based on control by the flight control unit 308.

The camera apparatus 100 is mounted on the drone apparatus 300 via "a gimbal apparatus that can perform image stabilization and reduce blurring, and can change the orientation of the camera apparatus 100". A gimbal control unit 311 is for controlling such a gimbal apparatus.

A video transmission unit 312 transmits (sends) images outputted from the camera apparatus 100 to an external unit. The mixer unit 314 mixes sensor information that the sensor processing unit 309 obtained and an operation signal from the control apparatus 329 that a user operates to control the drone apparatus 300, and outputs the information to the flight control unit 308. Thereby, the flight control unit 308, in a state in which it is performing flight control of the drone apparatus 300 in accordance with sensor information that the sensor processing unit 309 obtained, performs flight control corresponding to the operation signal from the control apparatus 329.

The CPU 301, the ROM 302, the RAM 303, the wireless IF 304, the power supply unit 305, the display unit 306, the operation unit 307, the flight control unit 308, the video transmission unit 312, the mixer unit 314, and the camera apparatus 100 are connected to a system bus 313.

Figure 8B:
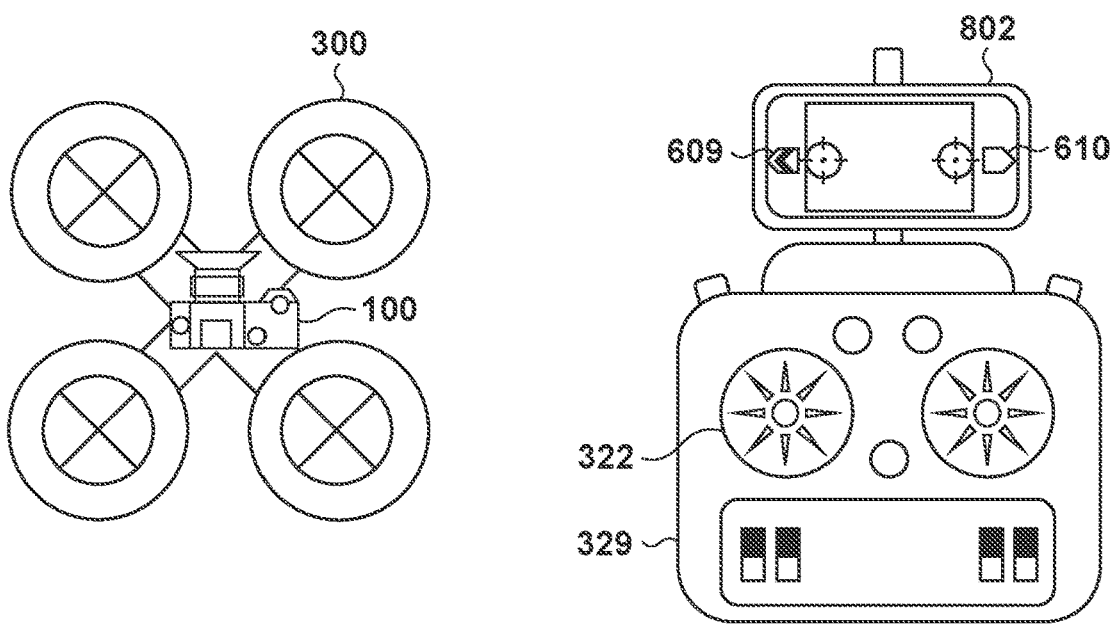

An example of the outer appearance of the drone apparatus 300 is given on the left side of FIG. 8B. As illustrated on the left side of FIG. 8B, the camera apparatus 100 (the lens apparatus 113 is mounted) is mounted on the drone apparatus 300.

Next, explanation will be given using a block diagram of FIG. 3B for an example of a hardware configuration of the control apparatus 329. A CPU 315 executes various processing using computer programs and data stored in a ROM 316 or a RAM 317. By this, the CPU 315 performs operation control for the control apparatus 329 overall, and executes or controls each process to be described later as something that the control apparatus 329 performs.

The setting data of the control apparatus 329, a computer program and data for activating the control apparatus 329, a computer program and data for basic operation of the control apparatus 329, and the like are stored in the ROM 316.

The RAM 317 has an area for storing computer programs and data that are loaded from the ROM 316 and data that is received from the outside via a wireless IF 318 and the like. Furthermore, the RAM 317 has a work area used when the CPU 315 executes various processes. Accordingly, the RAM 317 can provide various areas as appropriate.

The wireless IF 318 functions as a communication interface for performing wireless communication with an external unit. A power supply unit 319 performs power supply and power management in the control apparatus 329.

An operation unit 321 receives user operations in relation to a gimbal controller 323 and a stick controller 322, which are user interfaces, such as buttons, dials, a touch panel, a joystick or the like.

The gimbal controller 323 is a user interface that receives a user operation for controlling the gimbal apparatus (controlling the position and orientation of the camera apparatus 100). The stick controller 322 is a user interface for receiving operation input for operating the position and orientation of the drone apparatus 300.

When the operation unit 321 receives a user operation in relation to the gimbal controller 323 or the stick controller 322, the operation unit 321 generates an operation signal indicating the details of the user operation, and transmits the generated operation signal to the drone apparatus 300 via the wireless I/F 318. By this, the drone apparatus 300 performs flight control in accordance with the operation signal.

A video transmission unit 325 receives the image transmitted from the drone apparatus 300 via the wireless I/F 318, and displays the received image on a display device connected to a video output I/F 326 by outputting the image to the display device.

The CPU 315, the ROM 316, the RAM 317, the wireless I/F 318, the power supply unit 319, the operation unit 321, and the video transmission unit 325 are all connected to a system bus 328.

An example of the outer appearance of the control apparatus 329 is given on the right side of FIG. 8B. The control apparatus 329 has the stick controller 322. Also, in the control apparatus 329, a display device 802 is connected via the video output I/F 326, and the image transmitted by the video transmission unit 325 is displayed on the display device 802. The display device 802 is, for example, a smart phone or a tablet terminal device. Note that the video transmission unit 312 of the drone apparatus 300 may transmit an image after encoding the image to be transmitted, and in such a case, the video transmission unit 325 of the control apparatus 329 outputs the image to the display device via the video output I/F 326 after having decoded the image. This image includes a captured image or the various icons described in the first embodiment.

Also, when performing image capture by the camera apparatus 100, in the flight control unit 308, a loiter mode for stopping at specific mid-air coordinates is employed by not performing an operation of the stick controller 322 of the control apparatus 329. At this time, the drone apparatus 300 can use sensor information that the sensor processing unit 309 obtained to stop at the specific positions on the X-axis, the Y-axis, and the Z-axis in the space. Also, in this mode, even if an external disturbance, such as a sudden gust of wind, occurs, the flight control unit 308 controls the driving unit 310 appropriately to return to the original position. Furthermore, by the flight control unit 308 and the gimbal control unit 311 being linked, the camera apparatus 100 will continuously be oriented towards what is in front of the drone apparatus 300 and straightening for direct-facing can be easily carried out in the present embodiment by using a follow-up mode or the like that keeps the roll axis of the camera apparatus 100 horizontal. In other words, a user holding the control apparatus 329, in accordance with icons 609 and 610 displayed on the display device 802, can perform operations on the pan axis of the drone apparatus 300 to perform straightening of the camera apparatus 100 for direct-facing of the inspection target surface and then perform the image capturing. After that, when performing image capturing of the inspection target surface adjacent in the horizontal direction, the user operates the control apparatus 329 to operate the roll axis of the drone apparatus 300, and causes the drone apparatus 300 to move horizontally only in the horizontal direction, and stops the operation when the correct position is arrived at. By this, it becomes possible to perform the next image capture. Also, by performing pan axis operations on the drone apparatus 300 for the horizontal (rotation) direction and tilt axis operations of the gimbal apparatus for the vertical (rotation) direction in accordance with the vertical and horizontal icons, it is possible to perform straightening for direct-facing in relation to the inspection target surface in straightening for direct-facing where further horizontal (rotation) direction and vertical (rotation) direction operations are needed. Note that at this time, it is possible to perform straightening for direct-facing even when the inspection target surface is not orthogonal to the ground, and accurate defect inspection is enabled.

Third Embodiment

In the first embodiment, rotation instruction information was notified to the user, but in this embodiment, the rotation instruction information is outputted to the panhead 200, and the panhead 200 is caused to perform rotation control of the camera apparatus 100 in accordance with the rotation instruction information, and straightening for direct-facing of the camera apparatus 100 is performed in relation to the inspection target surface.

Figure 9A:
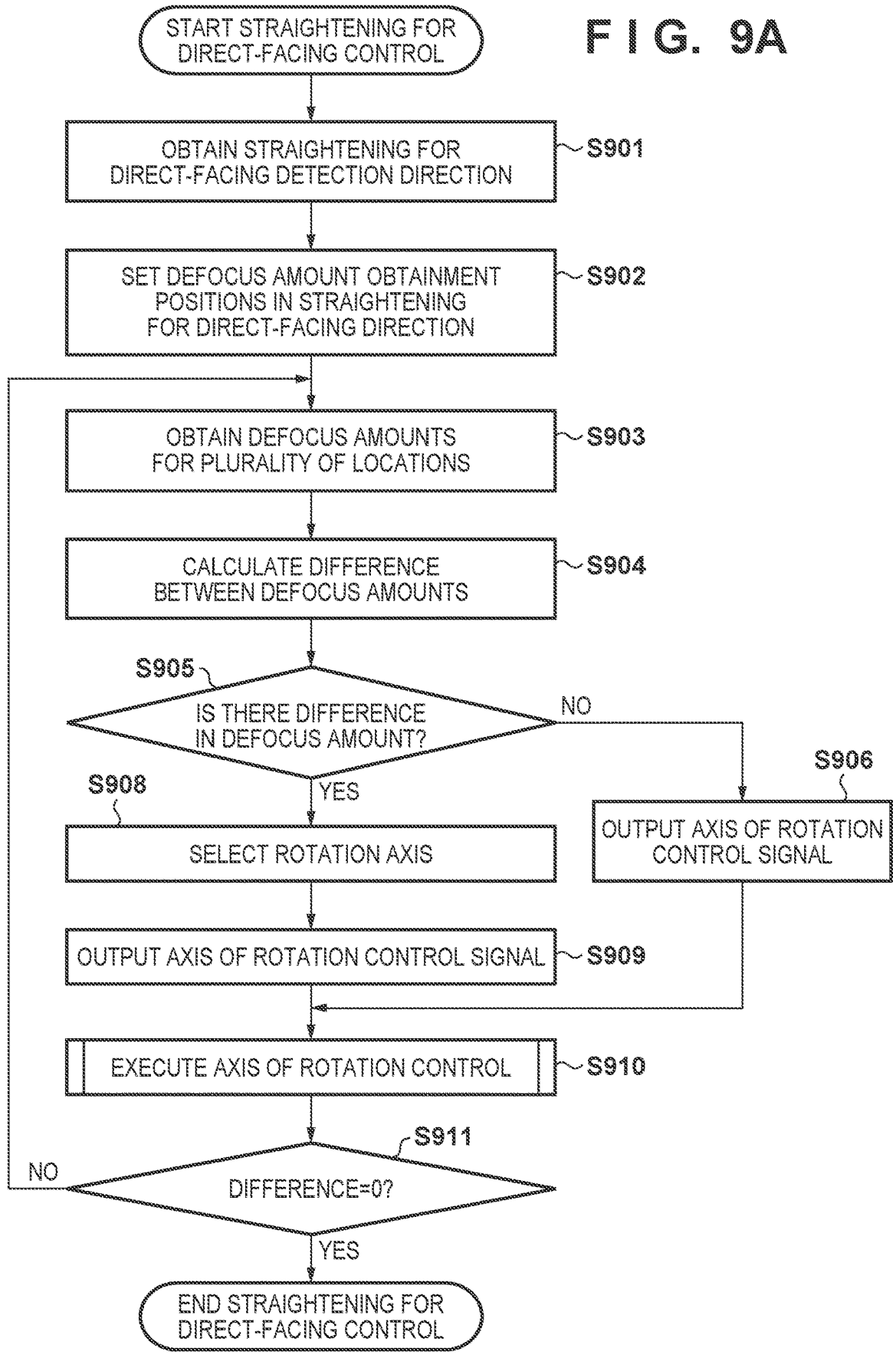
FIG. 9A is a flowchart of operations of an image capturing system.

Operations of the image capturing system according to the present embodiment are described in accordance with the flowchart of FIG. 9A. Similar to the first embodiment, the user installs the image capturing system so as to face the inspection target surface (as illustrated in FIG. 6AA, for example). Also, when an operation for starting straightening for direct-facing control is performed by a user operating the remote control apparatus 210, a captured image that is captured by the image sensor 104 is displayed on the display screen of the back of the camera apparatus 100 by the display unit 105 as a live view image. Then, processing according to the flowchart of FIG. 9A is started.

Note that the processing in each of S901 to S904 is similar to the processing of each of S701 to S704 described above, and therefore the description according to these is abbreviated.

In S905, the specification unit 126 determines whether or not the absolute value of the difference obtained in S904 is a threshold or higher. If the result of this determination is that the absolute value of the difference is the threshold or more, the processing advances to S908, and if the absolute value of the difference is less than the threshold, the processing advances to S906.

In S908, the specification unit 126, if the straightening for direct-facing detection direction is the "vertical direction", sets the axis of rotation of the camera apparatus 100 to "the tilt axis", and if the straightening for direct-facing detection direction is the "horizontal direction", the axis of rotation of the camera apparatus 100 is set to the "pan axis".

In S909, the output unit 127 generates an axis of rotation control signal including the axis of rotation of the camera apparatus 100 specified in S908 and the difference obtained in S904, and transmits the axis of rotation control signal to the panhead 200 via the external I/F 110.

Meanwhile, in S906, the output unit 127 generates an axis of rotation control signal including difference=0 (that is, the signal for instructing the driving for rotation to stop), and transmits the axis of rotation control signal to the panhead 200 via the external I/F 110.

In S910, the panhead 200 receives an axis of rotation control signal transmitted from the camera apparatus 100 via the external I/F 204, and by controlling rotation of the camera apparatus 100 based on the axis of rotation control signal, performs straightening of the camera apparatus 100 for direct-facing in relation to the inspection target surface. Details of the processing in S910 will be described later.

In S911, the CPU 101 determines whether or not the difference=0, and if the difference=0, the processing according to the flowchart of FIG. 9A ends, and if the difference 0, the processing advances to S903.

Figure 9B:
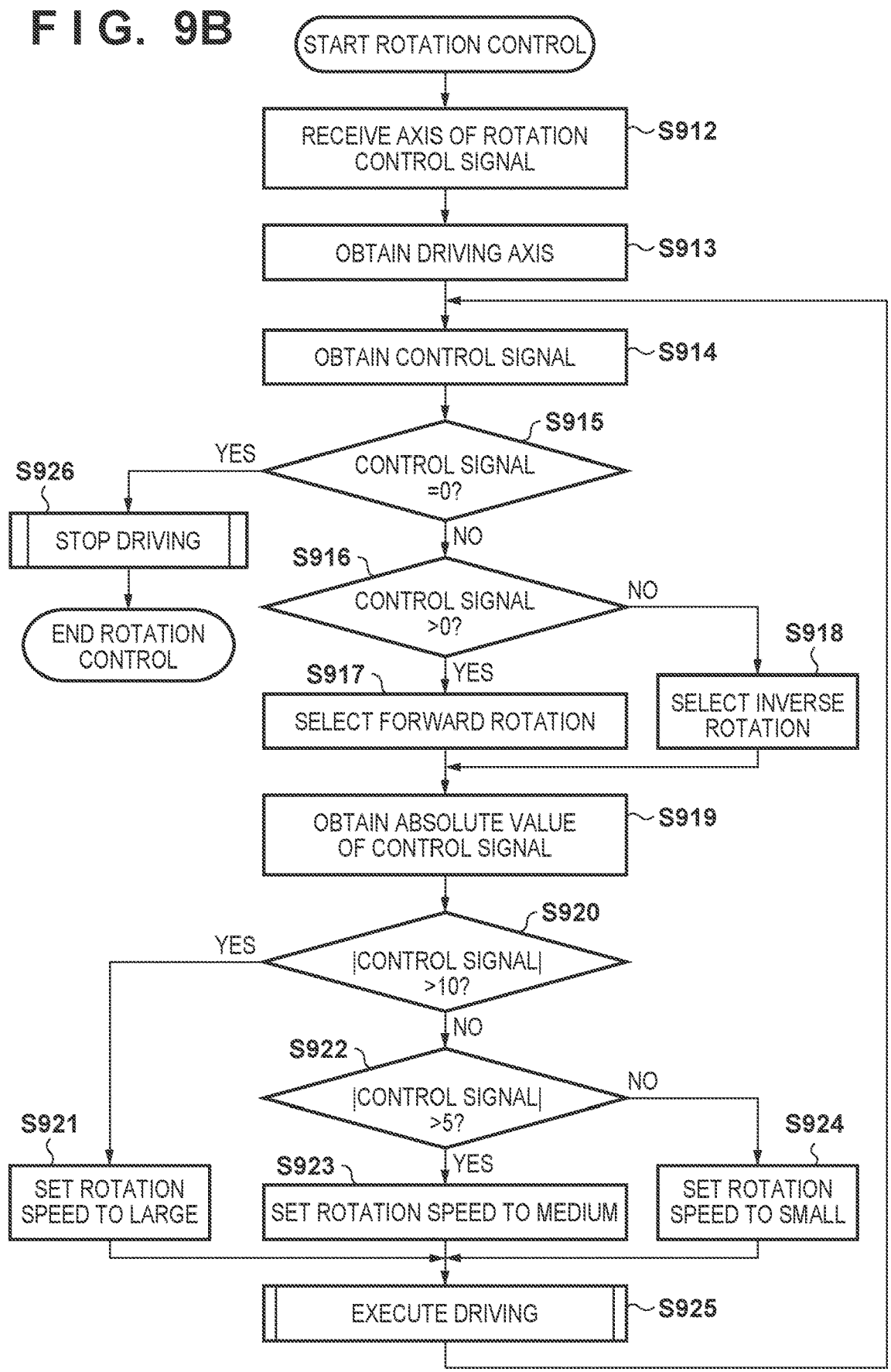
FIG. 9B is a flowchart illustrating detail of process in S910.

Next, for the details of the processing in S910 described above, description is given in accordance with the flowchart of FIG. 9B. In S912, the CPU 201 receives the axis of rotation control signal transmitted from the camera apparatus 100 via the external I/F 204.

In S913, the CPU 201 obtains the "axis of rotation" included in the axis of rotation control signal received in S912. In S914, the CPU 201 obtains the "difference" included in the axis of rotation control signal received in S912 as the control signal.

In S915, the CPU 201 determines whether or not the difference that the control signal obtained in S914 indicates is 0. In the case where the result of this determination is that the difference that the control signal obtained in S914 indicates is 0, the processing advances to S926, and in the case where the difference that the control signal obtained in S914 indicates is not 0, the processing advances to S916.

In S916, the CPU 201 determines whether or not the difference that the control signal obtained in S914 indicates is a positive value (its sign is positive). If the result of this determination is that the difference that the control signal obtained in S914 indicates is a positive value (the sign is positive), the processing advances to S917. Meanwhile, if the result of this determination is that the difference that the control signal obtained in S914 indicates is a negative value (the sign is negative), the processing advances to S918.

In S917, the CPU 201 selects a forward rotation as the rotation direction in which the camera apparatus 100 is caused to rotate about the axis of rotation obtained in S913. Meanwhile, in S918, the CPU 201 selects an inverse rotation as the rotation direction in which the camera apparatus 100 is caused to rotate about the axis of rotation obtained in S913.

In S919, the CPU 201 obtains an absolute value of the difference that the control signal obtained in S914 indicates. In S920, the CPU 201 determines whether or not the absolute value obtained in S919 is larger than 10. In a case where a result of this determination is that the absolute value obtained in S919 is greater than 10, processing advances to S921, and if the absolute value obtained in S919 is 10 or less, the processing advances to S922.

In S922, the CPU 201 determines whether or not an absolute value obtained in S919 is larger than 5. In a case where the result of the determination is that the absolute value obtained in S919 is larger than 5, the processing advances to S923, and if the absolute value obtained in S919 is 5 or less, the processing advances to S924.

In S921, the CPU 201 sets "high" has the rotation speed. In S923, the CPU 201 set "medium" as the rotation speed. In S924, the CPU 201 sets "low" has the rotation speed.

In S925, the CPU 201 controls the P/T axis driving unit 208 to cause the camera apparatus 100 to rotate in the rotation direction selected in either S917 or S918 at the rotation speed set in either S921, S923, or S924 about the axis of rotation obtained in S913.

Note, in S925, the CPU 201 controls the P/T axis driving unit 208 to execute various drive methods via a direct drive or a worm gear by a DC motor, a DC brushless motor, or a stepping motor that is connected to the panhead 200. However, in the present embodiment, explanation of the method for driving the panhead 200 is omitted since it is not directly relevant. Also, in the present embodiment, the driving speed is set to the three stages of "high", "medium", and "low", but in the control of the driving axis of the panhead 200, the speeds and stages may be changed within a scope that does not cause a loss of synchronism of the motor or an oscillation operation in the return control. Meanwhile, in S926, the CPU 201 controls the P/T axis driving unit 208, to stop the rotation of the camera apparatus 100.

Accordingly, by virtue of the present embodiment, the image capturing system is installed so as to face the inspection target surface, and furthermore by performing a start operation for straightening for direct-facing control in the remote control apparatus 210, it becomes possible to execute straightening for direct-facing without performing an operation of the panhead 200 or the like. By this, the user, after quickly performing straightening for direct-facing, can perform accurate defect inspection immediately.

Figure 10:
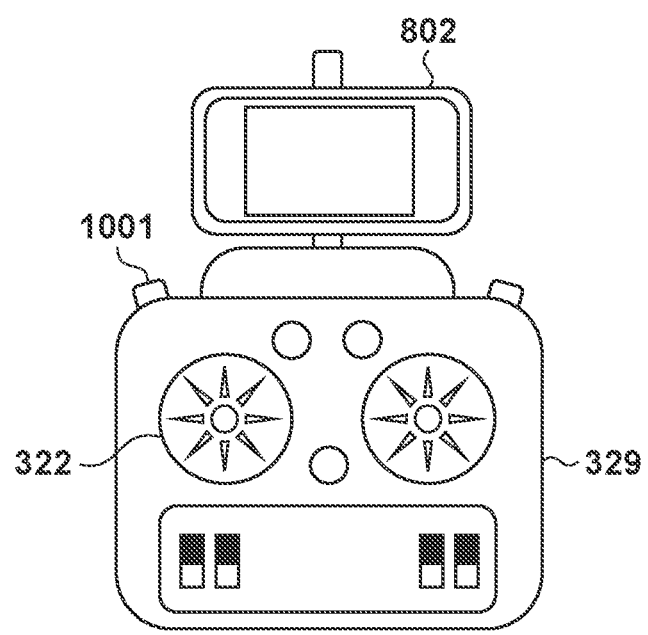
FIG. 10 is a view for describing a button 1001.

Note that it is possible to apply the present embodiment to the camera apparatus 100 installed on the drone apparatus 300. In such a case, as illustrated in FIG. 10, the control apparatus 329 that the user operates in order to control the drone apparatus 300 remotely has the button 1001 for instructing the start of control for straightening for direct-facing.

In such a case, when the user presses the above-described button 1001 in a state in which the front of the drone apparatus 300 is approximately facing the inspection target surface, the CPU 315 of the control apparatus 329 transmits to the drone apparatus 300 via the wireless I/F 318 an instruction to start control for straightening for direct-facing. Then, the CPU 301 of the drone apparatus 300, when the start instruction is received, causes the camera apparatus 100 to execute processing according to the flowchart of FIG. 9A (other than S910).

Here, the axis of rotation control signal outputted in S909 or in S906 is outputted to the mixer unit 314 via the system bus 313. The mixer unit 314 mixes the axis of rotation control signal and the sensor information that the sensor processing unit 309 obtained and outputs it to the flight control unit 308. By this, the flight control unit 308, in a state in which flight control of the drone apparatus 300 is performed in accordance with the sensor information that the sensor processing unit 309 obtained, performs flight control in accordance with the axis of rotation control signal outputted in 909 or in S906.

In the present embodiment, straightening for direct-facing control in relation to the inspection target surface is performed by applying the axis of rotation control signal to the pan axis of the drone apparatus 300. By such a configuration, the user of the drone apparatus 300 is enabled to perform straightening for direct-facing control by the flight control unit 308 of the drone apparatus 300 without performing subtle pan axis rotation operations on the stick controller 322.

Fourth Embodiment

In the present embodiment, in order to make it possible to capture an image, even after the rotation, of a point of interest that the camera apparatus 100 was capturing prior to causing the drone apparatus 300 to rotate in order to perform straightening of the camera apparatus 100 for direct-facing in relation to the inspection target surface, the drone apparatus 300 is caused to make a parallel shift with respect to the inspection target surface.

As illustrated in FIG. 11A, the image capturing region 404, which includes the inspection target region 403 of the inspection target surface in the social infrastructure construction 400, is made to fit into the image capturing range 602 of the camera apparatus 100 mounted in the drone apparatus 300. Then, to perform straightening of the camera apparatus 100 for direct-facing in relation to the inspection target surface, when the drone apparatus 300 is caused to rotate as illustrated in order in FIG. 11B and FIG. 11C, the image capturing region which fits into the image capturing range 602 in the inspection target surface shifts in order of the image capturing region 1101 and then the image capturing region 1102, and a part of the inspection target region 403 moves out of the image capturing region. Also, this shift is more conspicuous the larger the distance is between the camera apparatus 100 and the inspection target region.

In the present embodiment, so that the inspection target region 403 fits within the image capturing region of the camera apparatus 100 even after causing the drone apparatus 300 to rotate, the drone apparatus 300 is caused to make a parallel shift in relation to the inspection target surface after the drone apparatus 300 is caused to rotate.

Figure 12:
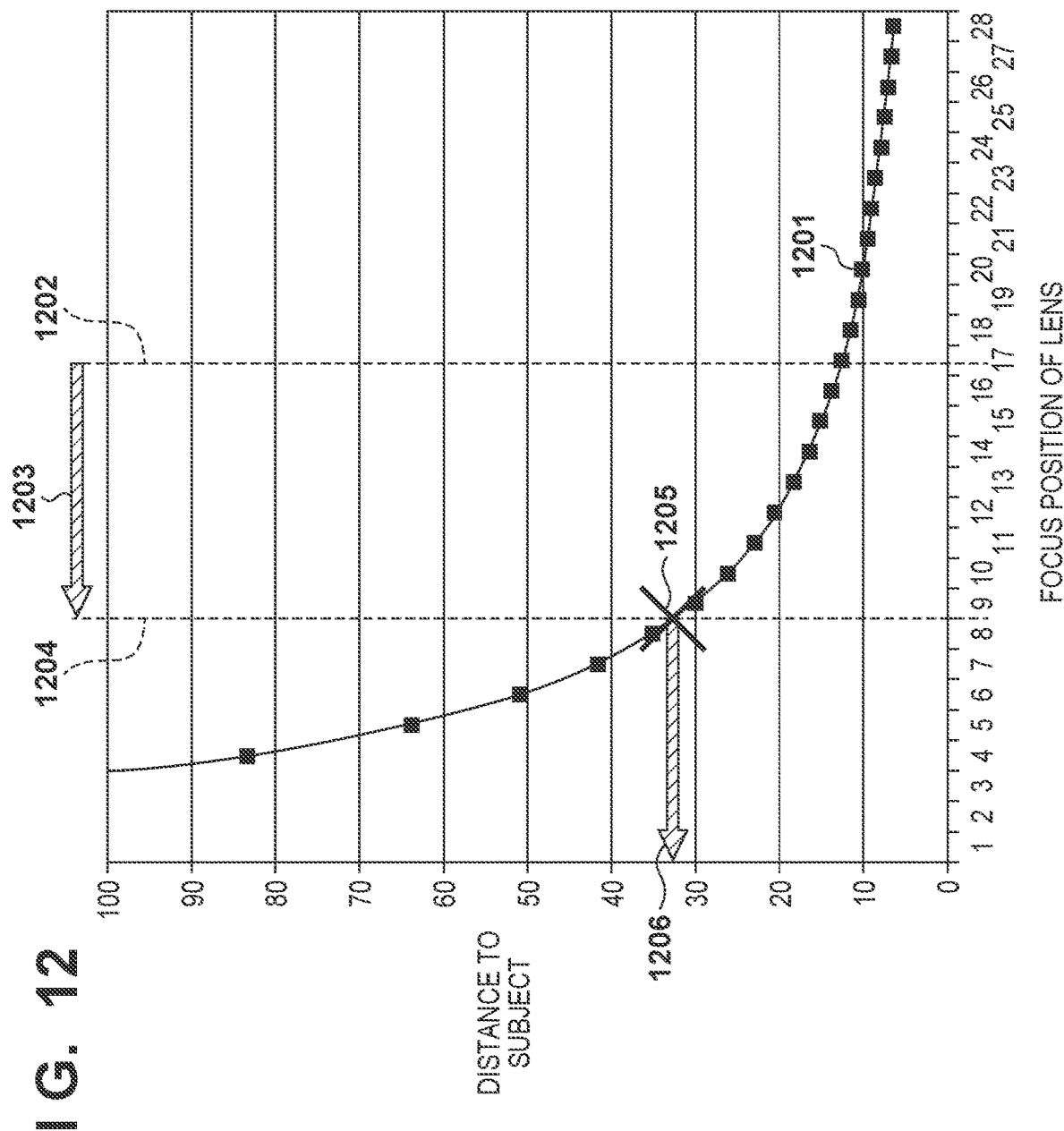
FIG. 12 is a view for describing a procedure for calculating a distance between the camera apparatus 100 and a subject by a defocus amount.

A procedure for obtaining the distance between the camera apparatus 100 and the subject from the defocus amount that the camera apparatus 100 obtained will be described using the graph of FIG. 12. In FIG. 12, the abscissa indicates the focus position of the lens in the lens apparatus 113, and the ordinate indicates the distance from the camera apparatus 100 to the subject.

A characteristic curve 1201 is a curve that indicates a relationship between the focus position of the lens in the lens apparatus 113 and the distance from the camera apparatus 100 to the subject. A line segment 1202 indicates a current focus position in the lens apparatus 113, a line segment 1203 indicates an obtained defocus amount, and a line segment 1204 indicates a focus position (=the in-focus position) that adds a defocus amount (the line segment 1203) to a current focus position (the line segment 1202). The value on the ordinate of the point 1205 which is the intersection point between the characteristic curve 1201 and the line segment 1204 can be obtained as the distance 1206 to the subject.

Next, a procedure for obtaining an amount that the camera apparatus 100 is caused to parallel shift (parallel shift amount) in relation to the inspection target surface in order to enable image capturing even after rotation of the point of interest that was being captured prior to the rotation in a case where the camera apparatus 100 is caused to rotate to perform straightening for direct-facing in relation to the inspection target surface will be described using FIG. 13.

Figure 13:
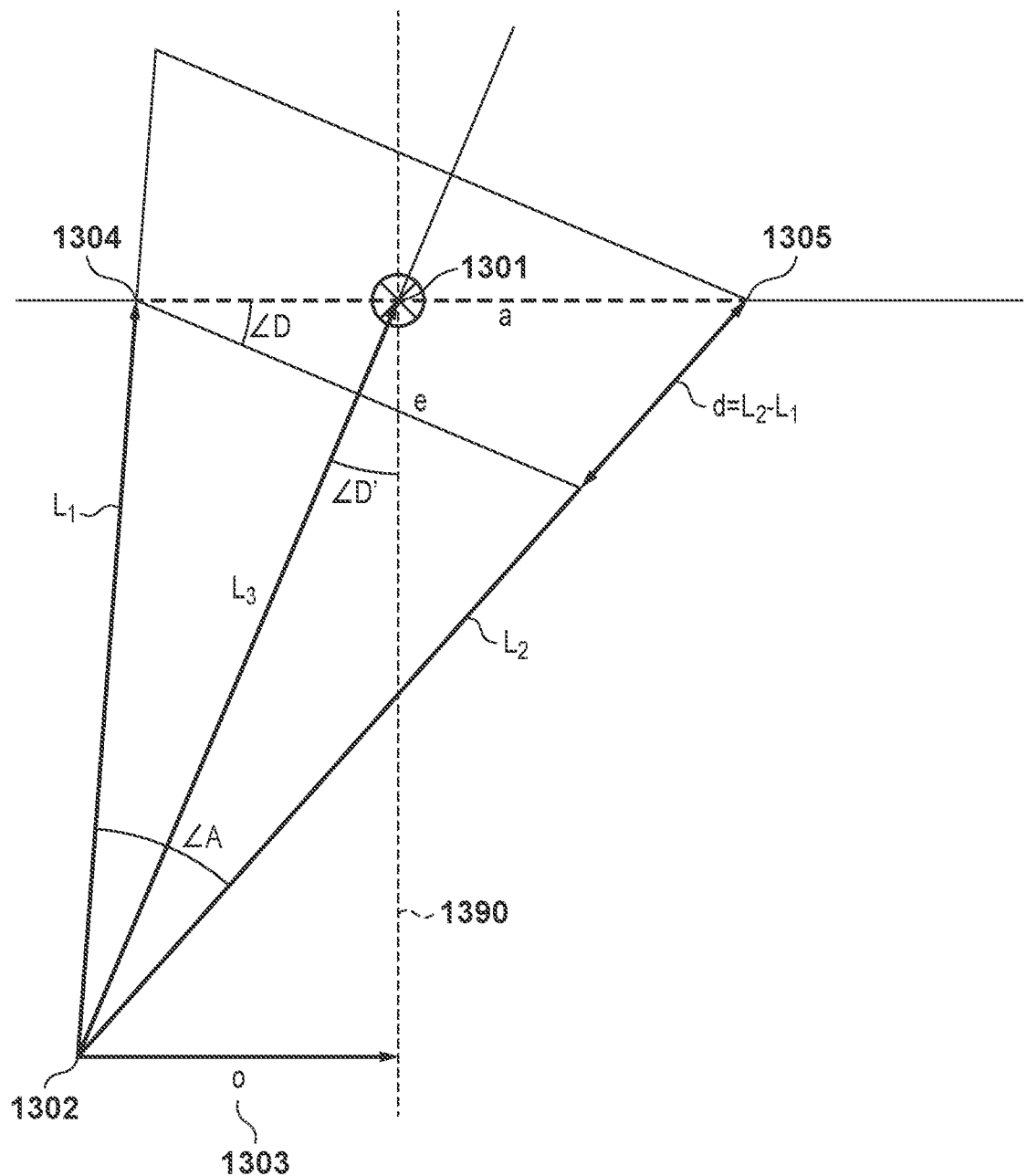
FIG. 13 is a view for describing a procedure for calculating a parallel shift amount.

In FIG. 13, after the camera apparatus 100 capturing the point of interest 1301 from a position 1302 is caused to rotate to perform straightening for direct-facing in relation to the inspection target surface, by performing the parallel shift by the parallel shift amount o 1303, the point of interest 1301 is made to fall within the image capturing range of the camera apparatus 100. Hereinafter, a description of a procedure for calculating the parallel shift amount o 1303 is given.

In FIG. 13, $\angle A$ indicates an angle of view of the lens apparatus 113 and L1 and L2 respectively indicate distances between the camera apparatus 100 and the subject for the obtainment position 1304 and the obtainment position 1305 of defocus amounts arranged in order to detect the horizontal direction degree for direct facing. Note that in fact the defocus amount obtainment positions are slightly different to the ends of the angle of view of the lens apparatus 113, but it is assumed that the defocus amount is obtained at the two ends of the angle of view of the lens apparatus 113 in order to simplify the calculation here. Also, L3 indicates a distance to the point of interest 1301 at the center of the angle of view on the inspection target surface from the position 1302. Also, a indicates a distance captured by the angle of view of the lens apparatus 113 in the inspection target surface, and d indicates a difference (L2−L1) between L2 and L1. Also, e is the length of the remaining side of a triangle where the angle between the line segment whose two ends are the position 1302 and the obtainment position 1304 and the line segment whose two ends are the position at the distance L1 from the position 1302 in the line segment connecting the position 1302 and the position 1305 and the position 1302 is made to be $\angle A$. Also, $\angle D$ indicates the angle between the side A and the side E in a triangle having three sides: the side A having the distance a, the side E having the distance e, and the side D having the distance d. Here, for e, from L1 and the angle $\angle A$, $e=2\times L1\times \sin(A/2)$, and for a, from the cosine theorem, $a=\sqrt{(L1^2+L2^2-2\times L1\times L2\times \cos A)}$. Accordingly, the angle $\angle D$ can be expressed as $\cos(D)=(a^2+e^2-d^2)/(2\times a\times e)$. Here, the angle $\angle D$ is of the same value as the angle $\angle D'$. LD' is an angle formed between a line segment 1390 that passes through the position of the camera apparatus 100 directly facing the inspection target surface and the position of the point of interest 1301 and the line segment that passes through the position 1302 and the position of the point of interest 1301. For this reason, the parallel shift distance o can be derived from L1, L2, L3, and $\angle A$ as $o=L3\times \cos(D)$.

A sequence of operations for causing the drone apparatus 300, which is positioned to face the point of interest 1301 on the inspection target surface from the position 1302, to rotate and make a parallel shift so as to directly face the inspection target surface while supplementing for the point of interest 1301 in the image capturing range will be described in FIGS. 14A to 14C.

Figure 14A:
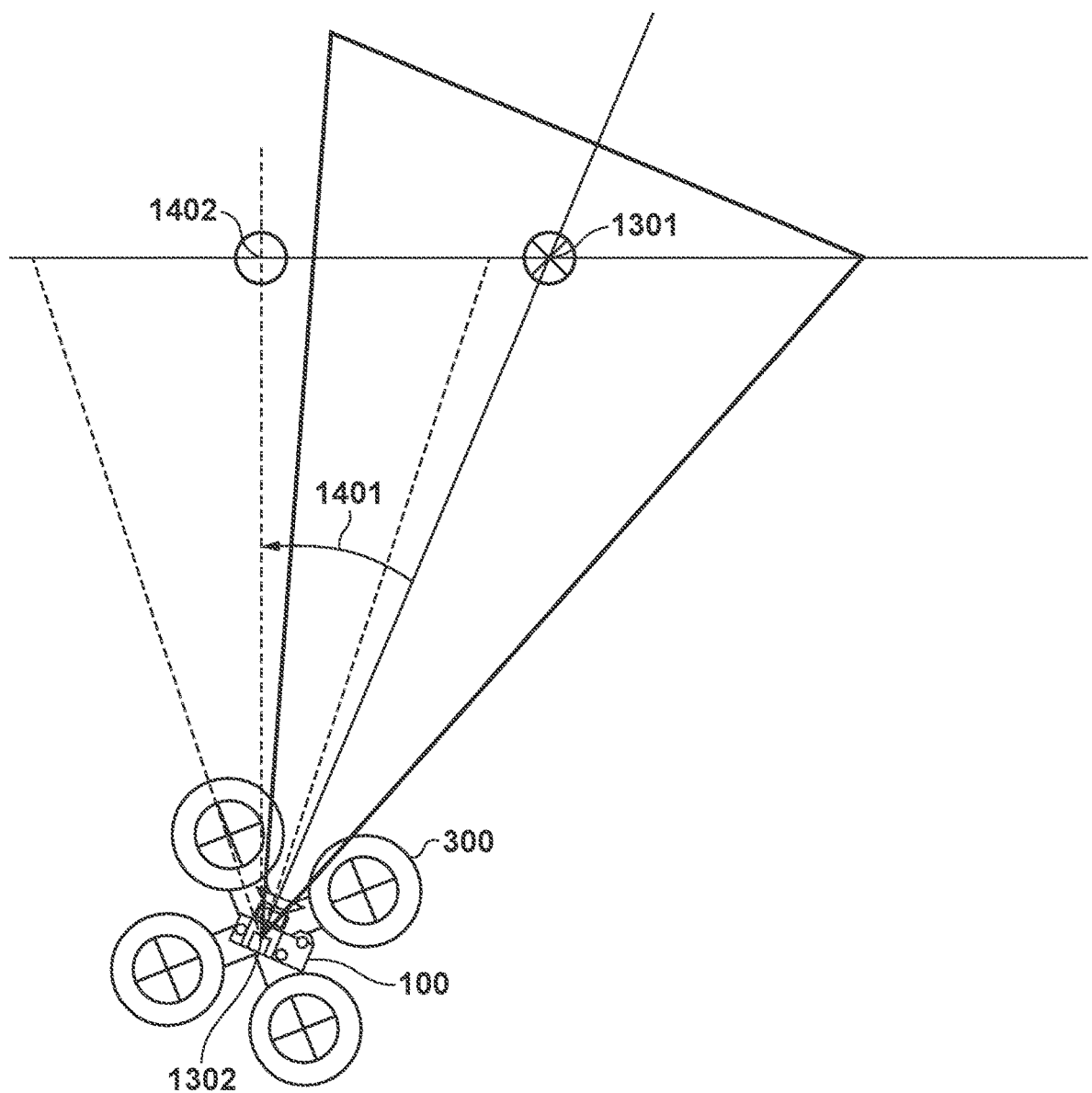
FIG. 14A is a view for describing a sequence of operations for supplementing for a point of interest 1301 in an image capturing range while causing a rotation and a parallel shift so as to directly face an inspection target surface.

In FIG. 14A, the drone apparatus 300 is arranged to face the point of interest 1301 on the inspection target surface from the position 1302. In this state, the drone apparatus 300, as described above, is rotated (rotated an angle 1401 about the pan axis) based on the difference between the obtained defocus amounts to directly face the inspection target surface, and the drone apparatus 300 is arranged to face a point of interest 1402. In other words, the point of interest of the camera apparatus 100 is the point of interest 1402.

Figure 14B:
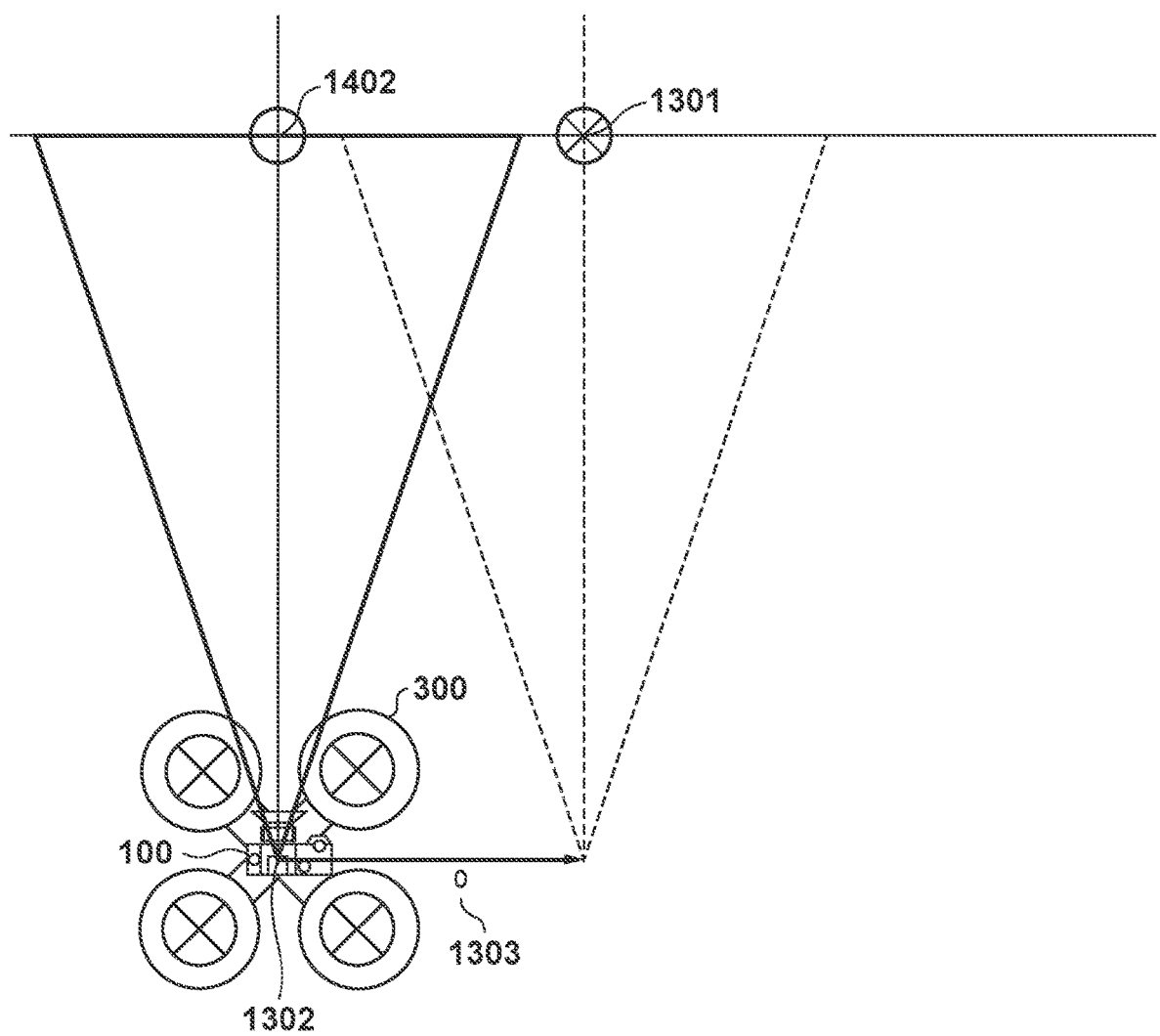
FIG. 14B is a view for describing a sequence of operations for supplementing for the point of interest 1301 in an image capturing range while causing a rotation and a parallel shift so as to directly face an inspection target surface.
Figure 14C:
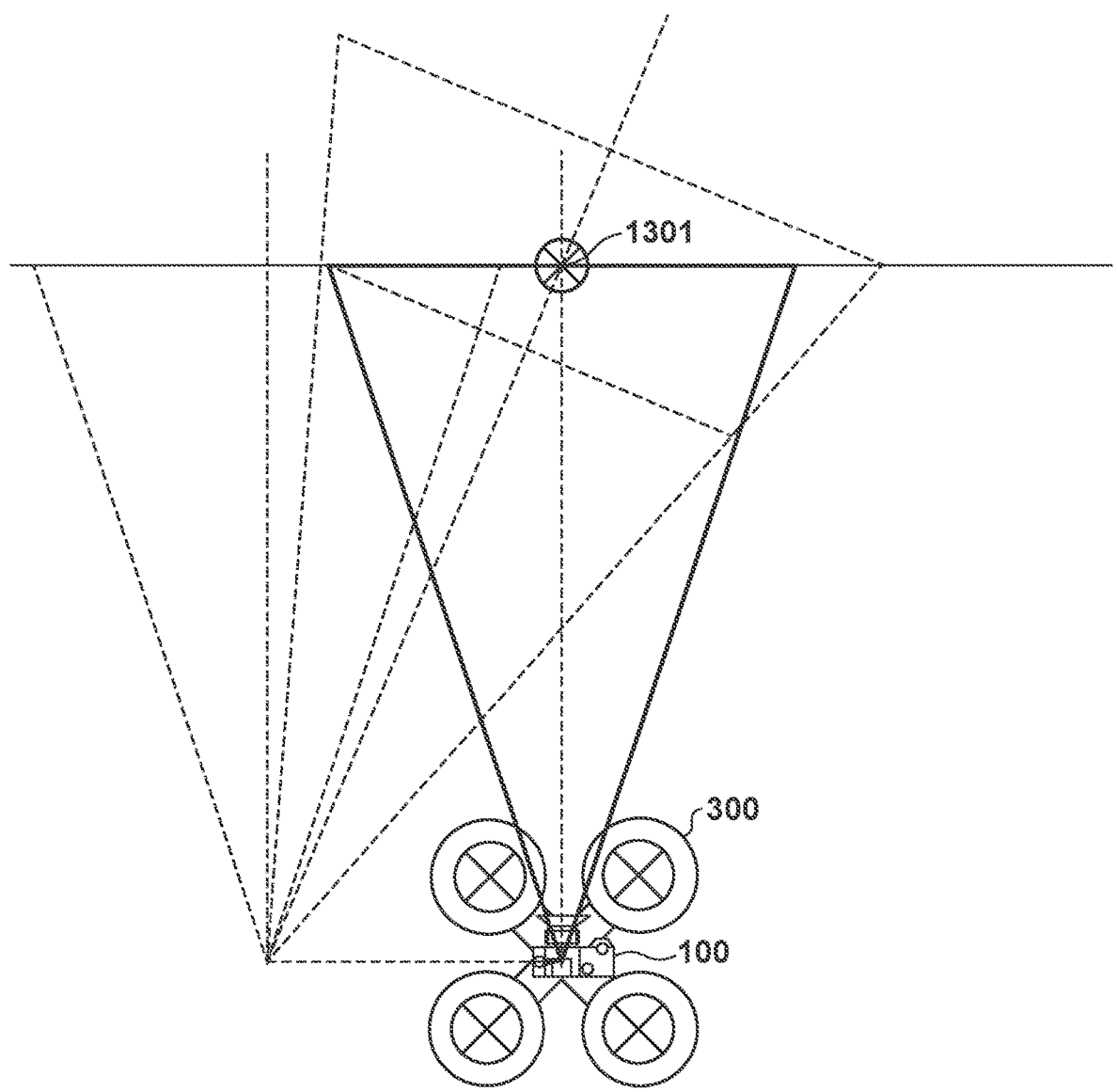
FIG. 14C is a view for describing a sequence of operations for supplementing for the point of interest 1301 in an image capturing range while causing a rotation and a parallel shift so as to directly face an inspection target surface.

Next, as illustrated in FIG. 14B, the drone apparatus 300, after being straightened to direct-face the inspection target surface, makes a parallel shift by the parallel shift amount o 1303 calculated by the above calculation from the current position coordinates obtained by the sensor information that the sensor processing unit 309 obtained. The result of this is, as illustrated in FIG. 14C, that the point of interest of the camera apparatus 100 and the drone apparatus 300 ends up returning to the point of interest 1301 prior to the rotation for straightening for direct-facing being performed.

Figure 15:
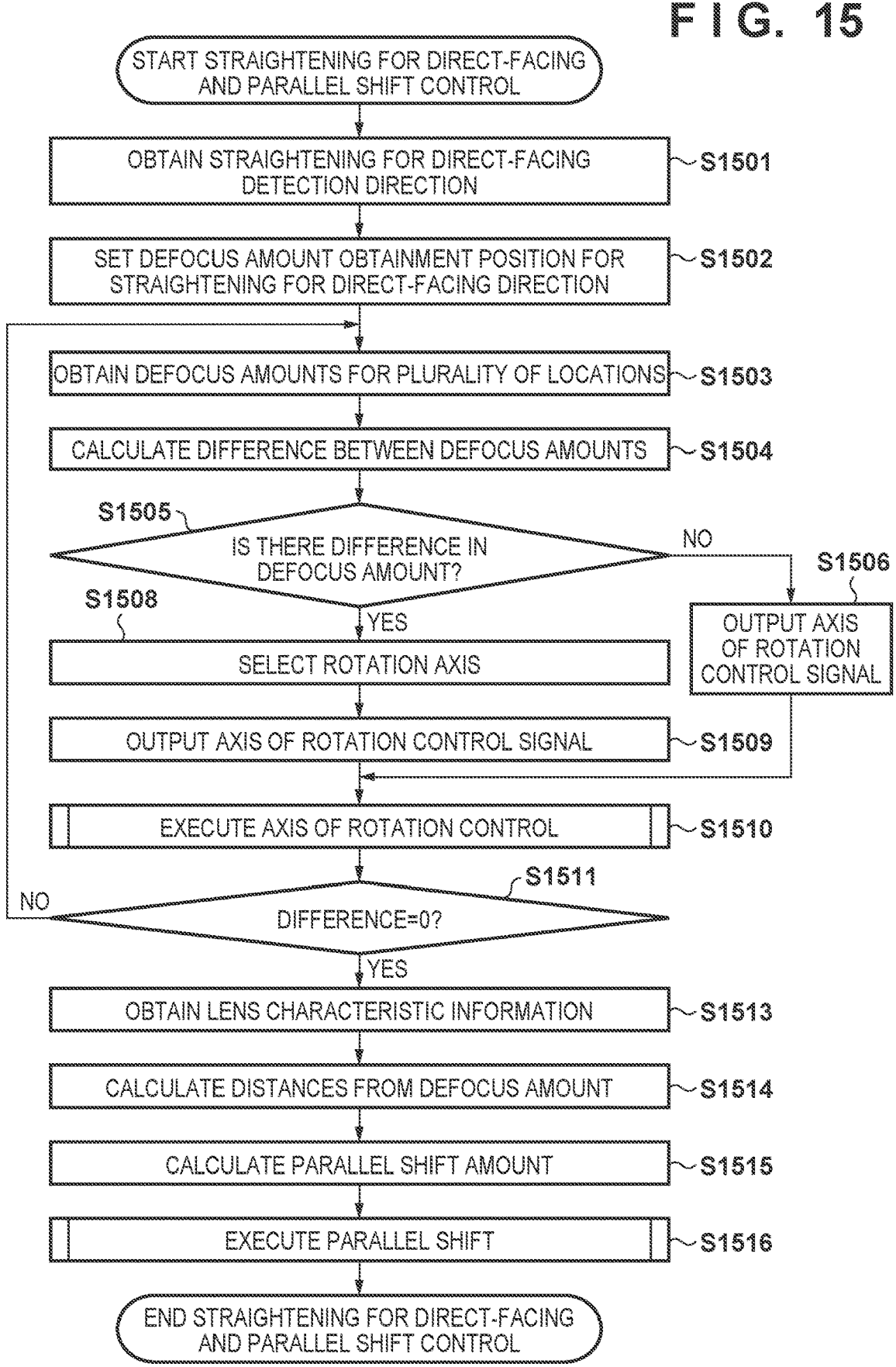
FIG. 15 is a flowchart of operations of an image capturing system.

Next, description will be given for operation of the image capturing system according to the present embodiment in accordance with the flowchart of FIG. 15. Below, as an example of a state in which the drone apparatus 300 is installed in relation to the point of interest 1301 of the inspection target surface, description will be given of a cases in which, in this state, processing according to the flowchart of FIG. 15 when the user presses the above button 1001 is started.

Note that the processing of each of S1501 to S1506 and S1508 to S1511 is similar to the processing in each of the above S901 to S906 and S908 to S911, and so description according to these is abbreviated.

In S1511, the CPU 101 determines whether the difference=0, and if the difference=0, determines that rotation control for straightening the drone apparatus 300 for direct-facing as illustrated in FIG. 14A is complete, and the processing advances to S1513.

Note that in the present embodiment, in S1503, as the plurality of positions on the inspection target surface for which the defocus amount is obtained, the defocus amount is obtained for the position of the point of interest 1301 in addition to the obtainment position 1304 and the position 1305 which are the positions for straightening for direct-facing control.

In S1513, the specification unit 126, from the lens apparatus 113, obtains lens characteristic information including the above characteristic curve 1201, the current focus position (the line segment 1202) of the lens apparatus 113, and the angle of view ∠A of the lens apparatus 113. The lens characteristic information is stored in the RAM 116 and the ROM 115 in the lens apparatus 113, and is obtained from the lens apparatus 113 via the lens communication unit 119 and the camera communication unit 107.

In S1514, the specification unit 126 calculates the above distances L1, L2, and L3 by performing the above processing using the defocus amounts obtained in S1503, the characteristic curve 1201 included in the lens characteristic information and the current focus position (the line segment 1202).

In S1515, the specification unit 126 calculates the parallel shift amount o by performing the above processing using the information obtained in S1513 and the distances L1, L2, and L3 calculated in S1514.

In S1516, the flight control unit 308 of the drone apparatus 300 controls the driving unit 310, and makes a parallel shift in relation to the inspection target surface by the parallel shift amount o calculated in S1515 from the current position coordinates obtained from the sensor information that the sensor processing unit 309 obtained.

Accordingly, in the present embodiment, the user approximately straightens the drone apparatus 300 and the camera apparatus 100 to directly face the inspection target surface, and then additionally, after positioning to capture the point of interest 1301 on the inspection target surface, presses the button 1001 of the control apparatus 329. By this, it becomes possible to accurately position the drone apparatus 300 by straightening for direct-facing while acquiring the point of interest 1301, and to perform an accurate inspection of a defect related to the point of interest by using an image captured at that position.

Fifth Embodiment

In the above embodiment, the obtainment position at which the defocus amount is obtained is made to be a position that was defined in advance. However, in the case where the defocus amount is always obtained from the same position, the following problem arises, for example.

Figure 16:
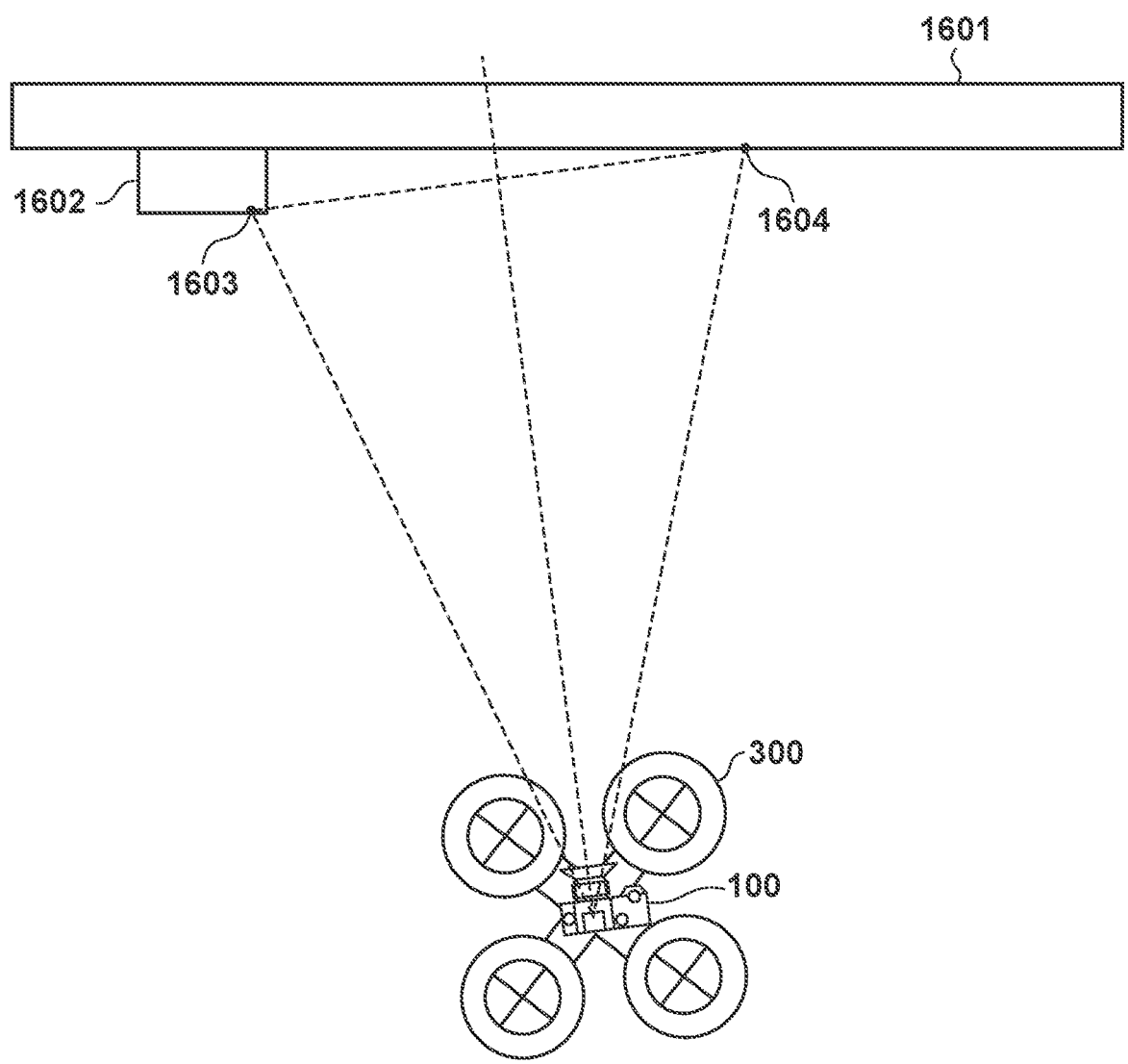
FIG. 16 is a view illustrating an example in which rotation control for an incorrect "directly-facing straightening" with respect to an inspection target surface 1601 based on a defocus amount is performed.

FIG. 16 illustrates an example in which incorrect rotation control for straightening for direct-facing in relation to the inspection target surface 1601 is performed based on a defocus amount obtained by the camera apparatus 100. In FIG. 16, reference numeral 1602 denotes a structural material installed at the front surface of the inspection target surface 1601, and the reference numerals 1603 and 1604 denote defocus amount obtainment positions positioned at approximately the end portions of the angle of view of the lens apparatus 113. Here, an obtainment position 1604 of the defocus amount on the right side is positioned on the front face of the inspection target surface 1601, but an obtainment position 1603 of the defocus amount on the left side is positioned on the front face of a structural material 1602. In such a state, when rotation control of the drone apparatus 300 is performed so as to reduce the difference between the defocus amount of the obtainment position 1603 and the defocus amount of the obtainment position 1604, as illustrated in FIG. 16, the drone apparatus 300 is in a state in which it is not directly facing the inspection target surface 1601. In other words, when rotation control for straightening for direct-facing is performed based on the defocus amount obtained from the obtainment position 1603 and the obtainment position 1604 as in FIG. 16, straightening for direct-facing in relation to the inspection target surface 1601 fails.

In the present embodiment, in consideration of this problem, the user is enabled to set a desirable position as the obtainment position for obtaining the defocus amount while viewing the captured image. Hereinafter, a method for setting the defocus amount obtainment position by the user operating the camera apparatus 100 is described using FIG. 17AA, FIG. 17AB, FIG. 17BA, and FIG. 17BB.

Figure 17A:
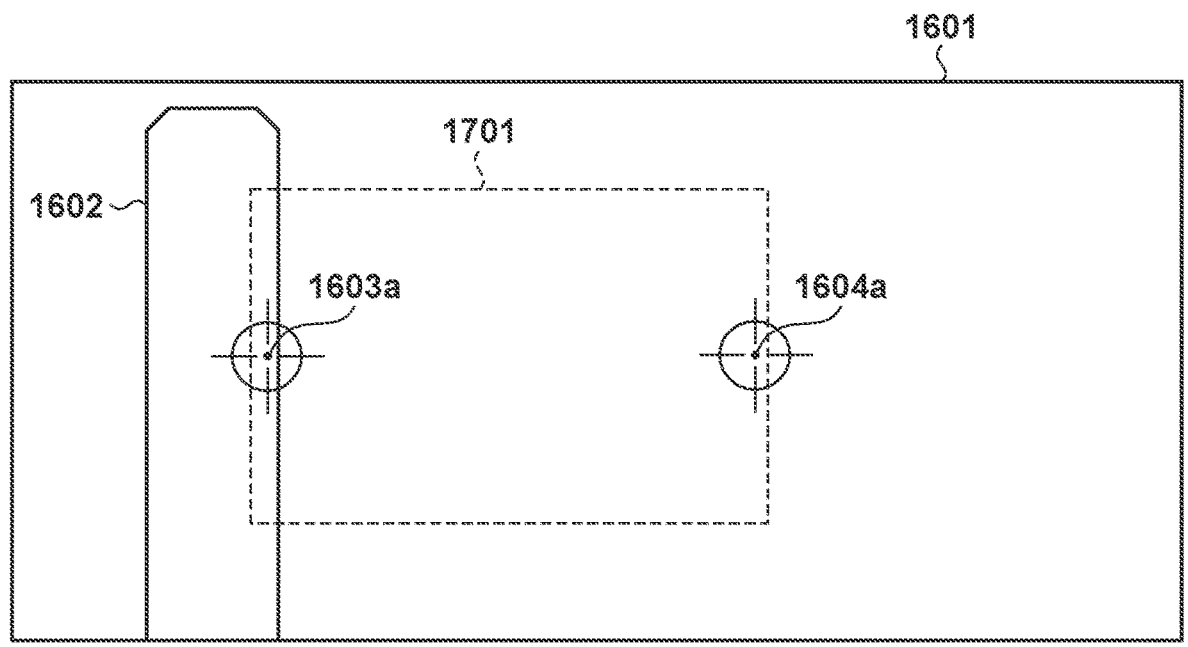
FIGS. 17AA and 17AB are views for explaining a method in which a user operates the camera apparatus 100 and sets a defocus amount obtainment position.
Figure 17A:
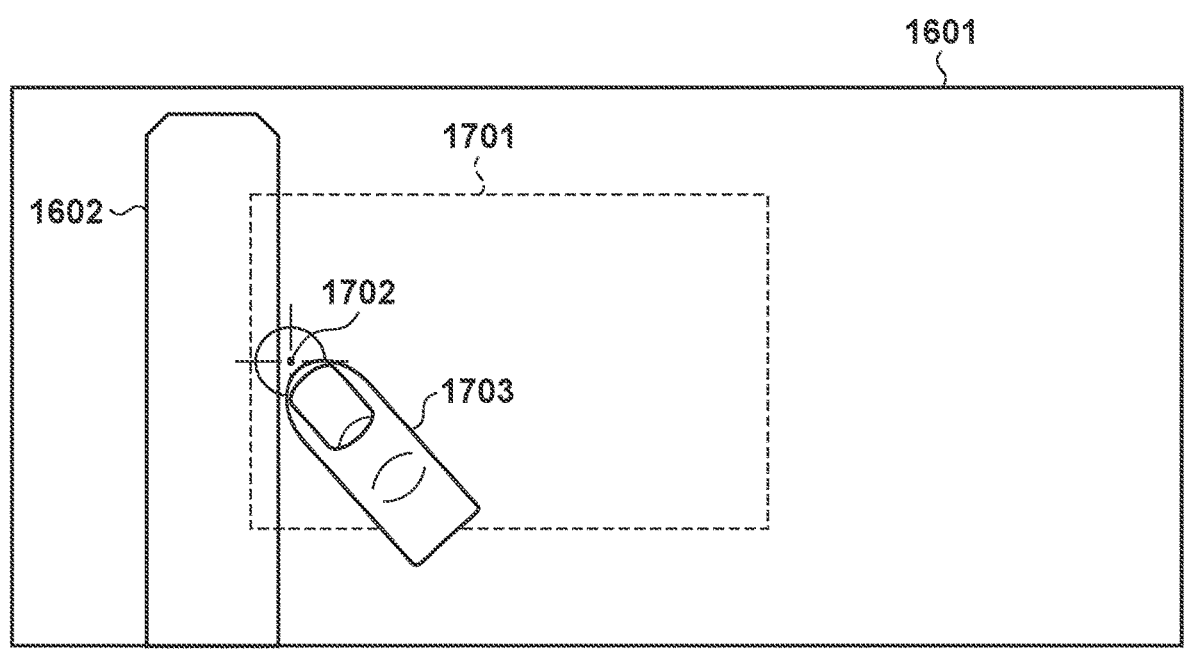

FIG. 17AA is a view illustrating a state of a display screen 1701 on the back of the camera apparatus 100 in a state in which the inspection target surface 1601 of FIG. 16 is captured from the front. In the display screen 1701, not only the front of the inspection target surface 1601 but a part of the structural material 1602 appears. An icon 1603a is displayed at a corresponding position on the display screen 1701 corresponding to the obtainment position 1603, and an icon 1604a is displayed at a corresponding position on the display screen 1701 corresponding to the obtainment position 1604. The user performs the following operation on the display screen 1701 to change the defocus amount obtainment position 1603 for the left side to a position on the inspection target surface 1601. Hereinafter, since the display screen 1701 is assumed to be a touch panel screen, an operation is performed on the display screen 1701, but in a case where the display screen 1701 is not a touch panel screen, an operation is performed using the operation unit 106, for example.

First, the user performs an operation for clearing the icon 1603a and the icon 1604a on the display screen 1701. By this, the icons 1603a and 1604a are cleared from the display screen 1701. When the icons 1603a and 1604a are cleared, "the defocus amount obtainment position" corresponding to each icon is cleared.

Then, the user touches the defocus amount obtainment position on the display screen 1701 with their finger. By this, the touched position is set as a new "defocus amount obtainment position". A state of the display screen 1701 in a case where an operation sets a new "defocus amount obtainment position" is illustrated in FIG. 17AB. In FIG. 17AB, the icon 1603a and the icon 1604a are cleared, and the user touches a position (position on the inspection target surface 1601) that avoids the structural material 1602 with their finger 1703. By this, an icon 1702 is displayed at the touched position, and the touched position is set as the "defocus amount obtainment position".

Figure 17B:
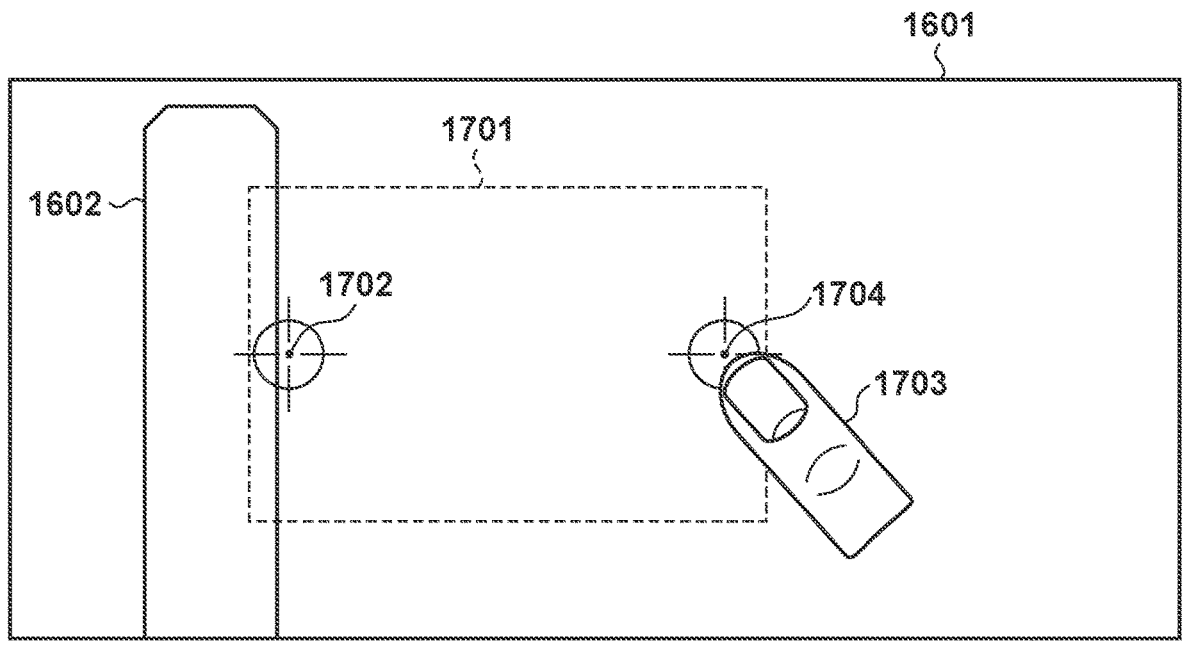
FIGS. 17BA and 17BB are views for describing a method in which a user operates the camera apparatus 100 and sets a defocus amount obtainment position.
Figure 17B:
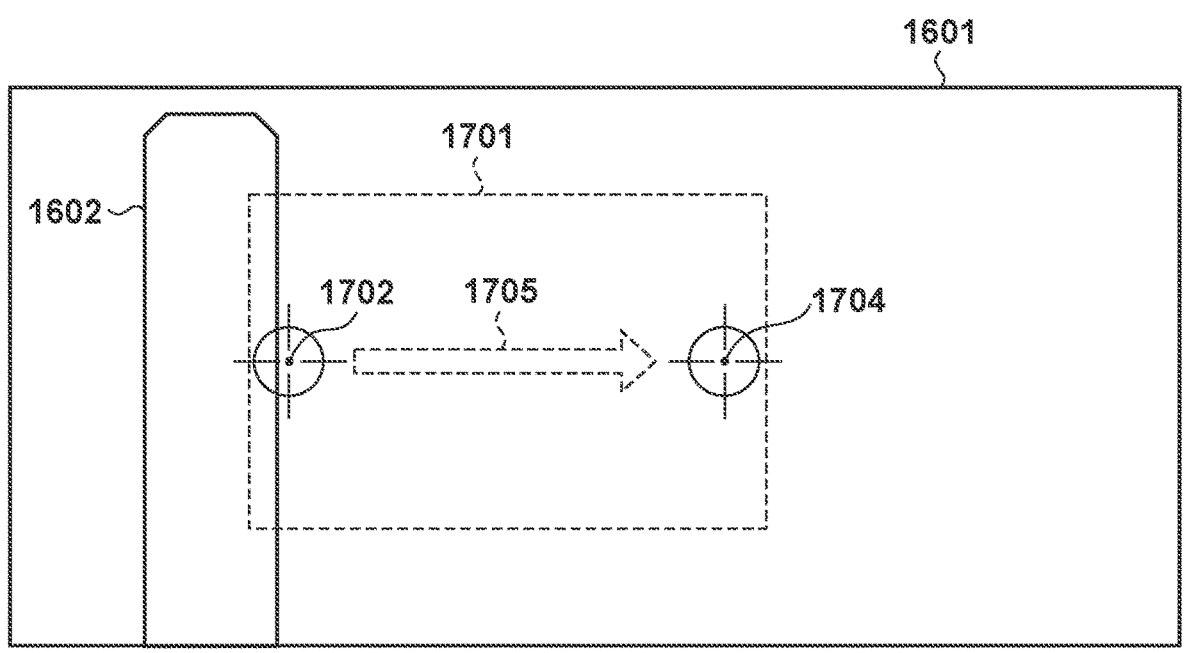

In this fashion, the user sets the defocus amount obtainment position for the left side. Also, the user, by a similar operation, sets the defocus amount obtainment position for the right side. Specifically, the user touches the defocus amount obtainment position for the right side on the display screen 1701 with their finger. By this, the touched position is set as a new "defocus amount obtainment position for the right side". In the state in FIG. 17AB, the state of the display screen 1701 in the case where an operation for setting a new "defocus amount obtainment position for the right side" is performed is illustrated on FIG. 17BA. In FIG. 17BA, the user touches a position that avoids the structural material 1602 (a position on the inspection target surface 1601) with their finger 1703, and thereby, an icon 1704 is displayed at the touched position. Also, the touched position is set as the "defocus amount obtainment position".

Then, since the "defocus amount obtainment position on the right side" is set after setting the "defocus amount obtainment position on the left side" in FIG. 17AA, FIG. 17AB, FIG. 17BA, and FIG. 17BB, the straightening for direct-facing detection direction is set from the left side to the right side (that is, the horizontal direction (the axis of rotation=the pan axis)). In FIG. 17BB, an arrow symbol icon 1705 that indicates the straightening for direct-facing detection direction from the left side to the right side is displayed. This arrow symbol icon 1705 indicates that the "defocus amount obtainment position for the left side" was set and then the "defocus amount obtainment position for the right side" is set (that is, the defocus amount obtainment position setting order).

Figure 18A:
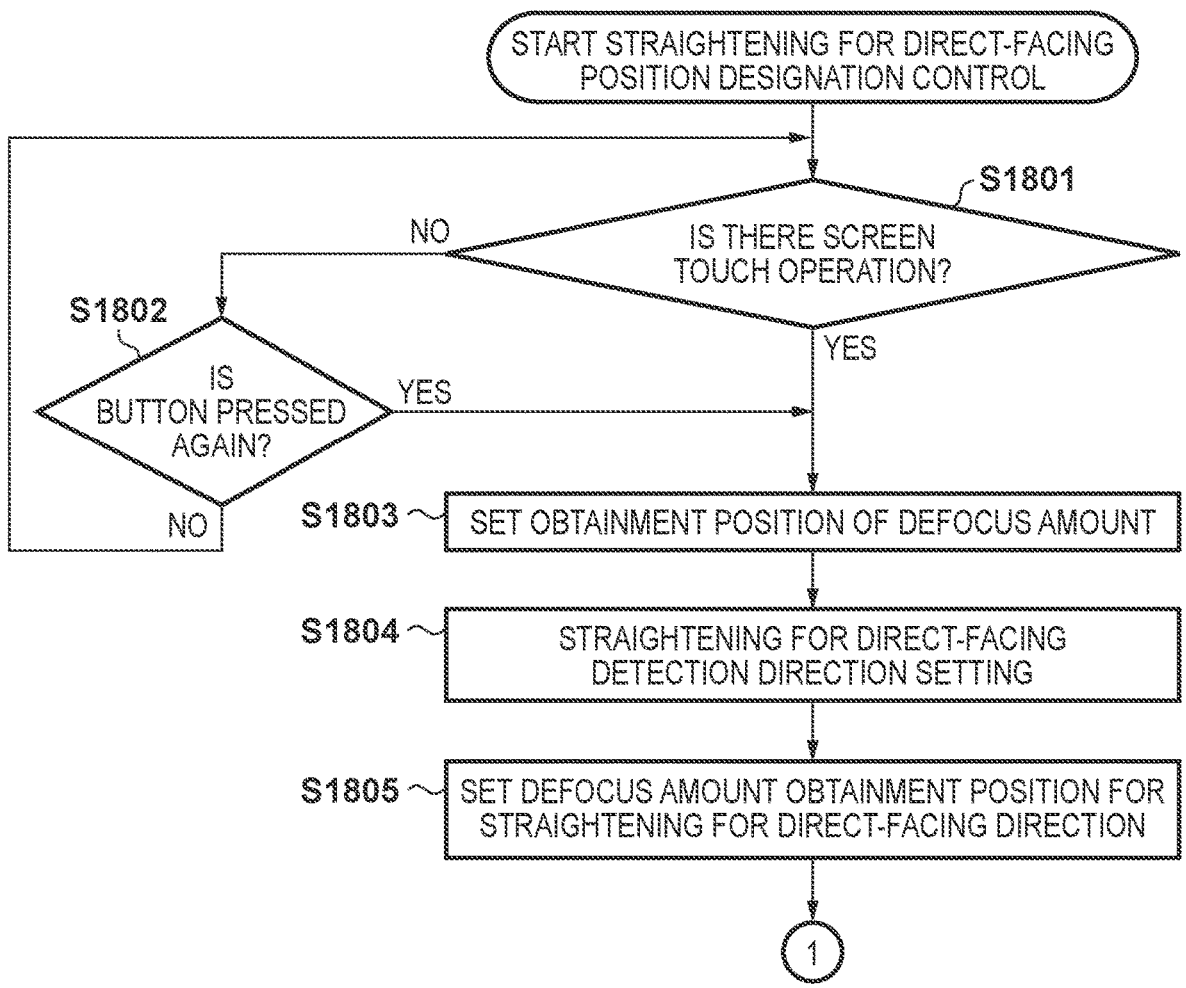
FIGS. 18A and 18B are flowcharts of operations of an image capturing system.
Figure 18B:
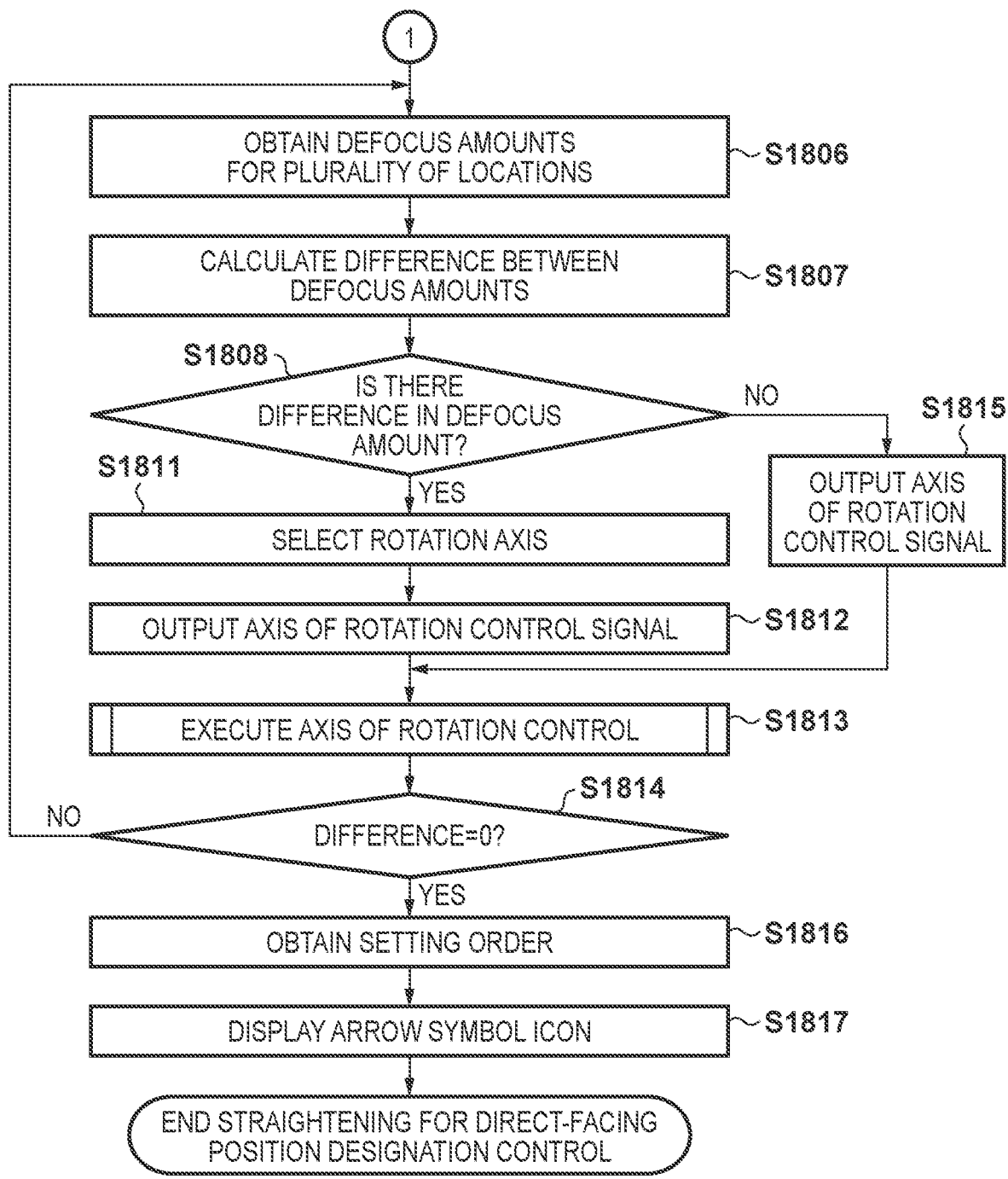

Operations of the image capturing system according to the present embodiment are described in accordance with the flowcharts of FIGS. 18A and 18B. The user sets the image capturing system to face the inspection target surface, and the captured image that was captured by the image sensor 104 is displayed on the display screen on the back of the camera apparatus 100 by the display unit 105 as the live view image. Then, when the user presses the above-described button 1001, processing according to the flowcharts of FIGS. 18A and 18B is started.

For example, the camera apparatus 100 is assumed to be positioned to be approximately straightened for direct-facing in relation to the inspection target surface 1601 illustrated in FIG. 16. Here, the user is in a state in which it is possible to confirm the default defocus amount obtainment positions 1603 and 1604 in the display screen 1701 of the camera apparatus 100. Here, when the user presses the button 1001 of the control apparatus 329, processing according to the flowcharts of FIGS. 18A and 18B is started.

In S1801, the CPU 101 of the camera apparatus 100 determines whether or not there was a touch operation corresponding to the display screen. In a case where the result of this determination is that there is a touch operation, the processing advances to S1803, and in a case where there is no touch operation, the processing advances to S1802.

In the case of FIG. 17AA, since the user, via the display screen 1701 of the camera apparatus 100, confirms that the defocus amount obtainment position 1603 for the left side is on the structural material 1602, the user performs a touch operation in relation to the display screen 1701.

In S1802, the CPU 101 determines whether the above button 1001 was pressed again. When the button 1001 is pressed, the control apparatus 329 detects the press, and notifies the camera apparatus 100 and the drone apparatus 300 that the press was detected. In the case where the result of this determination is that the above button 1001 was pressed again, the processing advances to S1803, and in the case where the above button 1001 has not been pressed again, the processing advances to S1801.

In S1803, the CPU 101 receives a touch operation for setting the "defocus amount obtainment position". Then, when the CPU 101 detects the touch operation by the user, the CPU 101 displays an icon at the touched position, and sets the touched position as the "defocus amount obtainment position".

For example, as illustrated in FIG. 17AB, when the touch operation for setting the defocus amount obtainment position for the left side is detected, in addition to displaying the icon 1702 at the touched position, the touched position is set as the defocus amount obtainment position for the left side. After that, as illustrated in FIG. 17BA, when the touch operation for setting the defocus amount obtainment position for the right side is detected, in addition to displaying the icon 1704 at the touched position, the touched position is set as the defocus amount obtainment position for the right side.

In S1804, the CPU 101 calculates a vector that is directed towards the position that the user touched after from the position that the user touched before, and sets the direction of the calculated vector as the straightening for direct-facing detection direction.

Note that the processing of each of S1805 to S1808 and S1811 to S1815 is similar to the processing in each of the above S902 to S905, S908 to S911, and S906, and so description according to these is abbreviated.

In S1814, the CPU 101 determines whether or not the difference=0, and if the difference=0, rotation control for straightening for direct-facing of the drone apparatus 300 is determined to be complete, and the processing advances to S1816.

In S1816, the CPU 101 obtains the setting order of the "defocus amount obtainment position" set first in S1803 as 1, and the setting order of the "defocus amount obtainment position" set thereafter as 2.

Then, in S1817, the CPU 101 causes an arrow symbol icon that indicates an arrow symbol directed from the "defocus amount obtainment position" whose setting order is 1 to the "defocus amount obtainment position" whose setting order is 2 to be displayed on a display screen.

Accordingly, by virtue of the present embodiment, it becomes possible for a user to designate the defocus amount obtainment position for straightening for direct-facing while confirming the display screen 1701. For example, it becomes possible to set the defocus amount obtainment position by avoiding the structural material 1602 or the like. By this, rotation control for reliably straightening for direct-facing becomes possible.

Also, by enabling the user to set the defocus amount obtainment position, it is possible to overwrite the straightening for direct-facing detection direction setting. Also, when the user performs image capturing of an adjacent inspection target surface, by defining the order of the obtainment position in the S1803 for the objective of recording that direction, it becomes possible to cause that direction to be presented on the display screen 1701 as the arrow symbol icon 1705.

Furthermore, by autonomously controlling the drone apparatus 300 and the camera apparatus 100, it becomes possible to, in a case of a configuration to capture the adjacent inspection target surface continuously, by using the setting details for the previously described obtainment position, designate a straightening for direct-facing control rotation direction and a continuous image capturing direction.

Sixth Embodiment

Configuration may be taken so as to display, on the display screen, the determination criteria for deciding which position is good for setting the obtainment position of the defocus amount (or which position is not good for setting the obtainment position of the defocus amount) within the display screen of the camera apparatus 100.

For example, configuration may be taken so as to obtain the defocus amount in relation to each position within the image capturing range of the camera apparatus 100, and display, on the display screen, a position for which was obtained a defocus amount that is wildly different from the others (an outlier) among the defocus amounts for the respective positions. Also, configuration may be taken so as to display, on the display screen, the positions other than positions for which an outlier was obtained on the display screen. Also, configuration may be taken so as to identifiably display, on the display screen, positions for which an outlier was obtained and positions for which a defocus amount that is not an outlier was obtained.

Note that, although each embodiment described above assumed that the display of information is performed on the display screen on the back of the camera apparatus 100, configuration may be taken to display on any screen. Also, in the above description, the determination as to whether or not A=B may be a determination as to whether or not A and B completely match, but it may be determined whether the difference between A and B is within an allowable range. In other words, it may be considered A=B when the difference between A and B is within an allowable range.

Also, the numerical values, the process timing, and the processing order or the like used in the above description are merely examples used to make a more specific explanation and are not intended to limit every embodiment to the numerical values, the process timing, and the processing order, or the like.

Some or all of the variations or embodiments described above may be appropriately used in combination. Also, the embodiments described above may be used in a selective manner either partially or wholly.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-070563, which was filed on Apr. 9, 2020 and which is hereby incorporated by reference herein in its entirety.

What is claimed is:

1. An image capturing apparatus, comprising:
   an obtainment unit configured to obtain defocus amounts at a plurality of positions within an image capturing range of the image capturing apparatus; and
   an output unit configured to obtain information instructing a rotation of the image capturing apparatus based on a difference between defocus amounts that the obtainment unit obtained, and output the obtained information.

2. The image capturing apparatus according to claim 1, further comprising:
   a unit configured to set an axis of the rotation in accordance with a user operation, wherein
   the plurality of positions differ in accordance with the axis.

3. The image capturing apparatus according to claim 1, wherein the output unit causes an icon indicating a rotation direction in accordance with a sign of the difference to be displayed.

4. The image capturing apparatus according to claim 3, wherein the output unit causes the icon to be displayed on a display screen of the image capturing apparatus.

5. The image capturing apparatus according to claim 3, wherein the output unit causes the icon to be displayed on a display screen of a control apparatus that a user operates to control a drone apparatus on which the image capturing apparatus is mounted.

6. The image capturing apparatus according to claim 1, wherein the output unit causes an icon indicating a degree of a rotation in accordance with an absolute value of the difference to be displayed.

7. The image capturing apparatus according to claim 1, wherein the output unit outputs the difference and an axis of the rotation selected in accordance with a user operation, to a panhead on which the image capturing apparatus is placed.

8. The image capturing apparatus according to claim 1, wherein the output unit outputs the information and an axis of rotation of the image capturing apparatus selected in accordance with a user operation, to a drone apparatus on which the image capturing apparatus is mounted.

9. The image capturing apparatus according to claim 8, wherein the output unit further calculates a parallel shift amount of the image capturing apparatus, for enabling capture of a point of interest that the image capturing apparatus was capturing prior to the drone apparatus rotating based on the axis of rotation and the information even after the rotation, based on a lens characteristic of the image capturing apparatus and a defocus amount at the point of interest, and outputs to the drone apparatus the calculated parallel shift amount.

10. The image capturing apparatus according to claim 1, further comprising:
    a configuration unit configured to set at least one position of the plurality of positions in accordance with a user operation.

11. The image capturing apparatus according to claim 10, wherein the configuration unit sets a rotation axis of the image capturing apparatus in accordance with a position setting order.

12. A method of controlling an image capturing apparatus, the method comprising:
    obtaining defocus amounts at a plurality of positions within an image capturing range of the image capturing apparatus; and obtaining information instructing a rotation of the image capturing apparatus based on difference between the obtained defocus amounts, and outputting the obtained information.

13. A non-transitory computer-readable storage medium for storing a computer program for causing a computer to function as:

an obtainment unit configured to obtain defocus amounts at a plurality of positions within an image capturing range of the image capturing apparatus; and an output unit configured to obtain information instructing a rotation of the image capturing apparatus based on a difference between defocus amounts that the obtainment unit obtained, and output the obtained information.

* * * * *